(12) United States Patent
Sakashita et al.

(10) Patent No.: US 8,568,521 B2
(45) Date of Patent: Oct. 29, 2013

(54) INDOOR UNIT OF AIR CONDITIONER

(75) Inventors: Akihiko Sakashita, Osaka (JP);
Tsuyoshi Yokomizo, Osaka (JP);
Yoshiharu Michitsuji, Osaka (JP);
Kenji Masuda, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 441 days.

(21) Appl. No.: 12/812,433

(22) PCT Filed: Jan. 13, 2009

(86) PCT No.: PCT/JP2009/000094
§ 371 (c)(1),
(2), (4) Date: Jul. 9, 2010

(87) PCT Pub. No.: WO2009/087980
PCT Pub. Date: Jul. 16, 2009

(65) Prior Publication Data
US 2010/0287968 A1    Nov. 18, 2010

(30) Foreign Application Priority Data

Jan. 11, 2008  (JP) ................................ 2008-004542
Jan. 25, 2008  (JP) ................................ 2008-014862

(51) Int. Cl.
*B01D 46/00*    (2006.01)

(52) U.S. Cl.
USPC .................. 96/418; 55/295; 55/428; 55/429; 55/431; 55/467.1; 55/466

(58) Field of Classification Search
USPC ............. 55/282.2, 428–433, 282–305, 285.2; 65/303–316; 165/4–10, 95, DIG. 10, 165/DIG. 11, DIG. 85; 62/303–316; 96/414–416, 418
See application file for complete search history.

(56) References Cited

U.S. PATENT DOCUMENTS

| | | | | |
|---|---|---|---|---|
| 5,319,827 A * | 6/1994 | Yang | ................................ | 15/319 |
| 6,082,179 A * | 7/2000 | Jeon et al. | .................... | 73/28.04 |
| 7,611,558 B2 * | 11/2009 | Oh et al. | ........................ | 55/432 |
| 7,897,695 B2 * | 3/2011 | Pan et al. | ................... | 525/329.1 |
| 8,034,138 B2 * | 10/2011 | Okada et al. | .................... | 55/289 |

(Continued)

FOREIGN PATENT DOCUMENTS

| | | |
|---|---|---|
| EP | 2 149 762 A1 | 2/2010 |
| JP | H03-186244 A | 8/1991 |

(Continued)

*Primary Examiner* — Duane Smith
*Assistant Examiner* — Thomas McKenzie
(74) *Attorney, Agent, or Firm* — Birch, Stewart, Kolasch & Birch, LLP

(57) ABSTRACT

Disclosed is an indoor unit having a dust storage container in which dust removed from an air filter is stored, and a dust collecting box into which the dust in the dust storage container is transferred by utilizing an effect of blown air. The dust storage container is provided with a full condition detection means for detecting a dust full condition of the dust collecting box. The full condition detection means includes an LED and a phototransistor which are opposed to each other with a storage portion interposed therebetween. After a dust transfer operation which transfers the dust from the dust storage container to the dust collecting box, an intensity of light of the LED that has passed through the storage portion is detected by the phototransistor. If the detected light intensity is equal to or less than a set value, a full condition of the dust collecting box is detected.

6 Claims, 15 Drawing Sheets

(56) References Cited

U.S. PATENT DOCUMENTS

| | | | |
|---|---|---|---|
| 8,253,368 B2* | 8/2012 | Landry et al. | 318/587 |
| 2006/0096459 A1* | 5/2006 | Iwano et al. | 96/224 |
| 2007/0060036 A1* | 3/2007 | Shibuya et al. | 454/187 |
| 2008/0264014 A1* | 10/2008 | Oh et al. | 55/423 |
| 2010/0287967 A1* | 11/2010 | Sakashita et al. | 62/303 |
| 2011/0120066 A1* | 5/2011 | Sakashita | 55/282.2 |
| 2012/0180665 A1* | 7/2012 | Jeong et al. | 95/282 |

FOREIGN PATENT DOCUMENTS

| | | |
|---|---|---|
| JP | 7-171078 A | 7/1995 |
| JP | 2004-301363 A | 10/2004 |
| JP | 2005-308274 A | 11/2005 |
| JP | 2006-71121 A | 3/2006 |

* cited by examiner (A)

(B)

(C)

(A)

(B)

(C)

INDOOR UNIT OF AIR CONDITIONER

TECHNICAL FIELD

The present invention relates to indoor units of air conditioners having a function of transferring dust of an air filter, which is stored in a storage portion, by utilizing air.

BACKGROUND ART

An indoor unit for air conditioners which has an air filter at an air inlet and which has dust removal means for removing dust captured by the air filter has been known. The indoor unit of this type is provided with a storage box in which the removed dust is stored, and the user needs to remove the storage box from the indoor unit to throw away the dust. However, in general, the indoor unit of this type is positioned at a higher location in the room, and therefore, taking out and putting back the storage box is burdensome especially for the elderly and women.

In view of this, an air conditioner having a function in which dust removed from the air filter is automatically discharged to the outside of the indoor unit (outside the room) is disclosed, for example, in Patent Document 1.

Specifically, according to the air conditioner of Patent Document 1, dust removal means (a waste removal box) for removing dust from the air filter is provided in the indoor unit. Further, a waste collection box and a vacuum suction fan are provided in an outdoor unit. The waste removal box of the indoor unit and the waste collection box of the outdoor unit are connected to each other through a dust transfer tube. In this air conditioner, waste (dust) is removed from the air filter by the waste removal box, and the waste is suctioned by the vacuum suction fan into the waste collection box. As a result, waste captured by the air filter is discharged to the outside of the unit without the hands of the user.

Citation List

Patent Document

PATENT DOCUMENT 1: Japanese Patent Publication No. 2004-301363

SUMMARY OF THE INVENTION

Technical Problem

However, according to the air conditioner of Patent Document 1, the dust needs to be thrown away when the waste collection box is filled with dust. The problem is, however, that it is impossible to determine whether the waste collection box is full or not in the air conditioner of Patent Document 1. Thus, the air conditioner continues to perform a suction operation even after the waste collection box becomes full. In this state, no matter how the air conditioner performs the suction operation, no dust is collected from the waste removal box, and the operation is performed in vain.

The present invention was made in view of the above problem, and it is an objective of the invention to detect a dust full condition of the dust collecting box in a simple way, in an indoor unit of an air conditioner having a function of transferring dust, which is removed from the air filter and stored in a storage portion, to a predetermined dust collecting box by utilizing air.

Solution to the Problem

To solve the above problem, according to the present invention, a dust full condition of the dust collecting box (90) is detected by directly or indirectly checking the condition of air passing through the storage portion (62) and flowing toward the dust collecting box (90).

Specifically, the first aspect of the present invention is intended for an indoor unit of an air conditioner, the indoor unit having in a casing (10) an indoor heat exchanger (22), an indoor fan (21) for drawing air from a room, and an air filter (30) located on an intake side of the indoor fan (21). The indoor unit includes: dust removal means (50) for removing dust captured by the air filter (30); a storage portion (62) for storing the dust removed by the dust removal means (50); a dust collecting box (90) which communicates with the storage portion (62); dust transfer means (80) for transferring, together with air, the dust stored in the storage portion (62) to the dust collecting box (90) by utilizing an effect of blown air or an effect of suction; and full condition detection means (70) for detecting a dust full condition of the dust collecting box (90), based on an amount of transmission of light through the storage portion (62).

In the above invention, dust in the air drawn in the casing (10) by the indoor fan (21) is captured by the air filter (30) when the air drawn by the indoor fan (21) passes through the air filter (30). The dust captured by the air filter (30) is removed by the dust removal means (50), and is stored in the storage portion (62). The dust in the storage portion (62) is transferred to and stored in the separate dust collecting box (90) by utilizing an effect of blown air or an effect of suction.

In the present invention, light is transmitted through the dust stored in the storage portion (62) at a time of a transfer operation or after the transfer operation by the dust transfer means (80). The amount of dust remaining in the storage portion (62) is detected according to the amount of light transmitted through space in the dust. Specifically, if the amount of transmission of light is equal to or less than a predetermined value, it is determined that the dust remains in the storage portion (62) despite the transfer operation. In this case, it is determined that the dust collecting box (90) is full of dust.

The second aspect of the present invention is intended for an indoor unit of an air conditioner, the indoor unit having in a casing (10) an indoor heat exchanger (22), an indoor fan (21) for drawing air from a room, and an air filter (30) located on an intake side of the indoor fan (21). The indoor unit of the present invention includes: dust removal means (50) for removing dust captured by the air filter (30); a storage portion (62) for storing the dust removed by the dust removal means (50); a dust collecting box (90) which communicates with the storage portion (62); dust transfer means (80) for transferring, together with air, the dust stored in the storage portion (62) to the dust collecting box (90) by utilizing an effect of blown air or an effect of suction; and full condition detection means (70) for detecting a dust full condition of the dust collecting box (90), based on an amount of air passing through the storage portion (62) toward the dust collecting box (90).

In the above invention, dust in the air drawn in the casing (10) by the indoor fan (21) is captured by the air filter (30) when the air drawn by the indoor fan (21) passes through the air filter (30). The dust captured by the air filter (30) is removed by the dust removal means (50), and is stored in the storage portion (62). The dust in the storage portion (62) is transferred to and stored in the separate dust collecting box (90) by utilizing an effect of blown air or an effect of suction.

In the present invention, air is introduced in the interior of the storage portion (62) after a transfer operation by the dust transfer means (80), for example. Here, the larger the amount of the dust in the dust collecting box (90) is, the more difficult it becomes for the air introduced in the storage portion (62) to flow into the dust collecting box (90). As a result, the amount of air passing through the storage portion (62) decreases. When the dust collecting box (90) is full of dust, little of the air introduced into the storage portion (62) flows into the dust collecting box (90). Thus, the amount of air passing through the storage portion (62) considerably decreases. The full condition of the dust collecting box (90) is detected according to the amount of flowing air.

The third aspect of the present invention is that, in the first aspect of the present invention, the full condition detection means (70) includes a light emitting portion (72) located outside the storage portion (62), and a light receiving portion (73) which is opposed to the light emitting portion (72), with the storage portion (62) interposed therebetween, and which detects an intensity of light of the light emitting portion (72) that has passed through the storage portion (62), and the full condition detection means (70) is configured to detect the dust full condition of the dust collecting box (90), based on the intensity of light detected by the light receiving portion (73).

In the above invention, the light emitting portion (72) and the light receiving portion (73) are arranged such that the storage portion (62) is interposed between the light emitting portion (72) and the light receiving portion (73). Light of the light emitting portion (72) is transmitted through a wall portion of the storage portion (62) and space in the dust. The intensity of the transmitted light is detected by the light receiving portion (73). The amount of dust stored in the storage portion (62) is detected according to the light intensity. Specifically, if the amount of transmission of light is large in the storage portion (62), the intensity of light detected by the light receiving portion (73) increases. It is thus determined that the amount of dust stored is small. In contrast, if the amount of transmission of light is small, the intensity of light detected by the light receiving portion (73) decreases. It is thus determined that the amount of dust stored is large.

The fourth aspect of the present invention is that, in the third aspect of the present invention, openings (64, 65) through which the light of the light emitting portion (72) is transmitted are formed in a storage wall of the storage portion (62). Further, the full condition detection means (70) includes a housing (71) which is provided so as to close the openings (64, 65) of the storage portion (62) and in which the light emitting portion (72) and the light receiving portion (73) are accommodated so as to correspond to the openings (64, 65) of the storage portion (62).

In the above invention, light of the light emitting portion (72) is transmitted through the storage portion (62) through the openings (64, 65) of the storage portion (62), and the intensity of the transmitted light is detected by the light receiving portion (73). Further, the openings (64, 65) of the storage portion (62) are closed by the housing (71), and therefore, the dust in the storage portion (62) does not overflow to the outside.

The fifth aspect of the present invention is that, in the third or fourth aspect of the present invention, the light emitting portion (72) is an LED, and the light receiving portion (73) is a phototransistor or a photodiode.

In the above invention, light of the LED is transmitted through the storage wall of the storage portion (62) and space in the dust, and the intensity of the transmitted light is detected by a phototransistor or a photodiode. The amount of dust stored in the storage portion (62) is detected according to the detected light intensity.

The sixth aspect of the present invention is that, in the first aspect of the present invention, the dust transfer means (80) includes an air passageway (86) for introducing air blown by the indoor fan (21) into the storage portion (62) and transferring the dust stored in the storage portion (62) to the dust collecting box (90).

In the above invention, the air blown by the indoor fan (21) is introduced in the storage portion (62) through the air passageway (86), and the dust in the storage portion (62) is transferred to the dust collecting box (90) together with the introduced air. That is, the dust removed from the air filter (30) is transferred to the dust collecting box (90) by utilizing an effect of air blown by the indoor fan (21).

The seventh aspect of the present invention is that, in the second aspect of the present invention, the dust transfer means (80) includes an air passageway (86) for introducing air blown by the indoor fan (21) into an interior of the storage portion (62) and transferring the dust stored in the storage portion (62) to the dust collecting box (90). Further, the full condition detection means (70) includes an air speed sensor (101) provided in the air passageway (86), and detects the dust full condition of the dust collecting box (90) based on an air speed detected by the air speed sensor (101).

In the above invention, the air blown by the indoor fan (21) is introduced in the storage portion (62) through the air passageway (86), and the dust in the storage portion (62) is transferred to the dust collecting box (90) together with the introduced air. That is, the dust removed from the air filter (30) is transferred to the dust collecting box (90) by utilizing an effect of air blown by the indoor fan (21).

In the present invention, if the amount of dust in the dust collecting box (90) increases, the amount of air passing thorough the air passageway (86) and the storage portion (62) decreases. As a result, the speed of air passing through the air passageway (86) decreases. In other words, a value detected by the air speed sensor (101) decreases. If the dust collecting box (90) is full of dust, the amount of air passing through the air passageway (86) and the storage portion (62) further decreases. As a result, the speed of air passing through the air passageway (86) further decreases as well. In other words, a value detected by the air speed sensor (101) significantly decreases. The full condition of the dust collecting box (90) is detected by the value detected by the air speed sensor (101).

The eighth aspect of the present invention is that, in the seventh aspect of the present invention, a throttle portion is provided at a midpoint of the air passageway (86), and the air speed sensor (101) of the full condition detection means (70) is positioned at the throttle portion.

In the above invention, the flow speed of air flowing in the air passageway (86) (i.e., the air speed in the air passageway (86)) increases at the throttle portion. The air flow speed at the throttle portion is detected by the air speed sensor (101).

The ninth aspect of the present invention is that, in the second aspect of the present invention, the dust transfer means (80) includes an air passageway (86) for introducing air blown by the indoor fan (21) into an interior of the storage portion (62) and transferring the dust stored in the storage portion (62) to the dust collecting box (90). Further, a throttle portion is provided at a midpoint of the air passageway (86), and the full condition detection means (70) includes a differential pressure sensor (111) which detects a differential pressure between a wind pressure of an upstream side of the throttle portion and a wind pressure of a downstream side of the throttle portion in the air passageway (86), and detects the dust full condition of the dust collecting box (90) based on the differential pressure detected by the differential pressure sensor (111).

In the above invention, the air blown by the indoor fan (21) is introduced in the storage portion (62) through the air passageway (86), and the dust in the storage portion (62) is transferred to the dust collecting box (90) together with the introduced air. That is, the dust removed from the air filter (30) is transferred to the dust collecting box (90) by utilizing an effect of air blown by the indoor fan (21). Further, in the air passageway (86), the air is depressurized when it passes through the throttle portion. Therefore, in the air passageway (86), the wind pressure (air pressure) of the downstream side of the throttle portion is lower than the wind pressure (air pressure) of the upstream side of the throttle portion. In other words, a differential pressure is generated between the flow on the upstream side and the flow on the downstream side of the throttle portion. The differential pressure is detected by the differential pressure sensor (111).

In the present invention, if the amount of dust in the dust collecting box (90) increases, the amount of air passing through the air passageway (86) and the storage portion (62) decreases. As a result, the wind pressure in the entire air passageway (86) decreases. In other words, the wind pressure in the air passageway (86) decreases in proportion to the amount of air flow. As a result, in the air passageway (86), a differential pressure between the flow on the upstream side and the flow on the downstream side of the throttle portion decreases as well. When the dust collecting box (90) becomes full of dust, the amount of air passing through the air passageway (86) and the storage portion (62) further decreases. As a result, the wind pressure of the entire air passageway (86) further decreases. Thus, in the air passageway (86), a differential pressure between the flow on the upstream side and the flow on the downstream side of the throttle portion decreases as well. In other words, a value detected by the differential pressure sensor (111) significantly decreases. The full condition of the dust collecting box (90) is detected according to the value detected by the differential pressure sensor (111).

The tenth aspect of the present invention is that, in the eighth or ninth aspect of the present invention, the dust transfer means (80) includes passageway opening/closing means (82) which is provided at a midpoint of the air passageway (86) and whose aperture is variable. Further, the throttle portion of the air passageway (86) is formed by the passageway opening/closing means (82) being half opened.

In the above invention, for example during a general operation, the passageway opening/closing means (82) is fully closed to inhibit the introduction of air to the storage portion (62). During a cleaning operation for the air filter (30), the passageway opening/closing means (82) is fully opened to introduce the air to the storage portion (62). Thus, the air blown by the indoor fan (21) is introduced into the storage portion (62) only when filter cleaning is necessary. To detect the full condition of the dust collecting box (90), the passageway opening/closing means (82) is half opened to introduce the air into the storage portion (62) through the air passageway (86). Here, in the air passageway (86), the air is depressurized when it passes through the passageway opening/closing means (82). Therefore, in the air passageway (86), a differential pressure is generated between the flow on the upstream side and the flow on the downstream side of the passageway opening/closing means (82). The differential pressure is detected by the differential pressure sensor (111).

The eleventh aspect of the present invention is that, in the second aspect of the present invention, the dust transfer means (80) includes an air passageway (86) for introducing air blown by the indoor fan (21) into an interior of the storage portion (62) and transferring the dust stored in the storage portion (62) to the dust collecting box (90), and passageway opening/closing means (82) provided at a midpoint of the air passageway (86) and switching between a state in which air blown by the indoor fan (21) is introduced into the storage portion (62) through the air passageway (86) and a state in which the introduction of the air is inhibited. Further, the full condition detection means (70) includes a bypass passage (106) whose flow passage area is smaller than a flow passage area of the air passageway (86) and which connects between an upstream side and a downstream side of the passageway opening/closing means (82) in the air passageway (86), and an air speed sensor (107) provided in the bypass passage (106), and the full condition detection means (70) detects the dust full condition of the dust collecting box (90) based on an air speed detected by the air speed sensor (107) when the passageway opening/closing means (82) is fully closed.

In the above invention, the passageway opening/closing means (82) is fully opened during a cleaning operation for the air filter (30), and the air blown by the indoor fan (21) is introduced into the storage portion (62) through the air passageway (86). The dust in the storage portion (62) is transferred to the dust collecting box (90) together with the introduced air. In other words, the dust removed from the air filter (30) is transferred to the dust collecting box (90) by utilizing an effect of air blown by the indoor fan (21).

To detect the full condition of the dust collecting box (90), the passageway opening/closing means (82) is fully closed, and the air blown by the indoor fan (21) is introduced into the storage portion (62) through the bypass passage (106). Here, if the amount of dust in the dust collecting box (90) is large, the amount of air passing through the bypass passage (106) and the storage portion (62) decreases. As a result, the speed of air in the bypass passage (106) decreases. That is, a value detected by the air speed sensor (107) decreases. If the dust collecting box (90) becomes full of dust, the amount of air passing through the bypass passage (106) and the storage portion (62) further decreases. As a result, the speed of air in the bypass passage (106) further decreases. In other words, a value detected by the air speed sensor (107) significantly decreases. The full condition of the dust collecting box (90) is detected by the value detected by the air speed sensor (107). Also, the flow passage area of the bypass passage (106) is smaller than the flow passage area of the air passageway (86). Therefore, even if the volume of air blown by the indoor fan (21) is the same, the speed of air in the bypass passage (106) is greater than the air speed in the air passageway (86). The greater speed of air is detected by the air speed sensor (107).

The twelfth aspect of the present invention is that, in the sixth, seventh, ninth, or eleventh aspect of the present invention, the air passageway (86, 88) is configured to introduce the air blown by the indoor fan (21) into the storage portion (62) before the air blown by the indoor fan (21) passes through the indoor heat exchanger (22).

In the above invention, the air which is blown by the indoor fan (21) and which has not been supplied to the indoor heat exchanger (22) is used to transfer the dust in the storage portion (62) to the dust collecting box (90).

ADVANTAGES OF THE INVENTION

As described above, according to the present invention, full condition detection means (70) for detecting a dust full condition of the dust collecting box (90) based on an amount of transmission of light through the storage portion (62), is provided in an indoor unit having a function in which dust, which is removed from the air filter (30) and stored in the storage portion (62), is transferred to a dust collecting box (90). It is thus possible to recognize the full condition of the dust collecting box (90) in a simple way. This means that it is possible to prevent the dust transfer means (80) from performing a transfer operation in vain, when the dust collecting box (90) is full of dust. As a result, the dust transfer operation and the dust collection work by the dust collecting box (90) can be appropriately done.

In the case where the dust in the dust collecting box (90) is collected and a dust transfer operation is performed thereafter, but nevertheless the amount of transmission of light through the storage portion (62) does not change, it can be determined that clogging may occur in a passageway through which dust is transferred. This means that problems such as clogging in a passageway through which dust is transferred, can be found early. Therefore, highly reliable indoor units can be provided.

According to the second aspect of the present invention, full condition detection means (70) for detecting a dust full condition of the dust collecting box (90), based on an amount of air passing through storage portion (62) toward the dust collecting box (90), is provided in an indoor unit having a function in which dust removed from the air filter (30) and stored in the storage portion (62) is transferred to a dust collecting box (90). It is thus possible to recognize the full condition of the dust collecting box (90) in a simple way. Consequently, as in the above case, the dust transfer operation and the dust collection work by the dust collecting box (90) can be appropriately done.

According to the third aspect of the present invention, the light emitting portion (72) and the light receiving portion (73) are provided to detect the full condition of the dust collecting box (90) based on the intensity of light transmitted through the storage portion (62). With this structure, it is possible to detect the intensity of light transmitted through the storage portion (62) and detect the full condition of the dust collecting box (90) with reliability.

According to the fourth aspect of the present invention, the openings (64, 65) through which light of the light emitting portion (72) is transmitted are formed in the storage portion (62), and the housing (71) in which the light emitting portion (72) and the light receiving portion (73) are accommodated is disposed so as to close the openings (64, 65). Therefore, the storage portion (62) can be easily manufactured. For users, it is uncomfortable if the dust in the storage portion (62) is visible from the outside, and therefore, it is preferable that the storage wall of the storage portion (62) is opaque. In that case, part of the storage wall needs to be provided with a transparent window for transmitting light emitted by the light emitting portion (72). Thus, time and effort are required to manufacture the storage portion (62). In view of this, in the present invention, the openings (64, 65) are formed in the storage wall. In this structure, light is transmitted more easily, compared to the case in which the transparent window is used, and the storage portion (62) is manufactured easily. Since the openings (64, 65) are closed by the housing (71), there is no possibility of dust leakage from inside the storage portion (62).

According to the fifth aspect of the present invention, an LED is used as the light emitting portion (72), and a phototransistor or a photodiode is used as the light receiving portion (73). Thus, the full condition detection means (70) having a simple and compact structure can be achieved. In addition, despite the simple structure, it is possible to reliably determine the full condition of the dust collecting box (90).

According to the sixth aspect of the present invention, the air blown by the indoor fan (21) is introduced in the storage portion (62) to transfer the dust. In other words, the dust is transferred by utilizing an effect of air blown by the indoor fan (21). Thus, the dust in the storage portion (62) can be easily transferred into the dust collecting box (90) without individually providing transfer means, such as a suction fan. As a result, efficiency in handling the dust can be improved without an increase in size of a unit and an increase in costs.

According to the seventh aspect of the present invention, the air blown by the indoor fan (21) is introduced in the storage portion (62) to transfer the dust, as in the sixth aspect of the present invention. Thus, the dust in the storage portion (62) can be easily transferred into the dust collecting box (90) without individually providing transfer means, such as a suction fan. Further, in the seventh aspect of the present invention, the air speed sensor (101) is provided in the air passageway (86), and the full condition of the dust collecting box (90) is detected based on the air speed detected by the air speed sensor (101). Therefore, the full condition detection means (70) having a simple and compact structure can be achieved.

According to the eighth aspect of the present invention, a throttle portion is provided in the air passageway (86), and the air speed sensor (101) is positioned at the throttle portion. With this structure, it is possible to detect a greater air speed. Thus, it is possible to reliably detect an air speed in the air passageway (86) and change in the air speed. As a result, the accuracy in detecting the full condition of the dust collecting box (90) can be improved.

According to the ninth aspect of the present invention, as in the sixth aspect of the present invention, the air blown by the indoor fan (21) is introduced in the storage portion (62) to transfer dust. Therefore, the dust can be easily transferred from the storage portion (62) to the dust collecting box (90) without individually providing transfer means. Further, according to the ninth aspect of the present invention, a throttle portion is provided in the air passageway (86), and the differential pressure sensor (111) is provided for detecting a differential pressure between the flow on the upstream side and the flow on the downstream side of the throttle portion. The full condition of the dust collecting box (90) is detected based on the differential pressure detected by the differential pressure sensor (111). With this structure, the full condition detection means (70) having a simple and compact structure can be achieved.

According to the tenth aspect of the present invention, the passageway opening/closing means (82) is positioned in the air passageway (86). Thus, for example during a general operation in which the air filter (30) is not cleaned, the passageway opening/closing means (82) is fully closed, thereby making it possible to supply all the air blown by the indoor fan (21) to the indoor heat exchanger (22). As a result, it is possible to prevent a decrease in comfort of the resident.

Further, according to the tenth aspect of the present invention, the passageway opening/closing means (82) is half opened, thereby forming a throttle portion of the air passageway (86). In other words, the passageway opening/closing means (82) is used without individually providing throttle means. Thus, it is possible to reliably detect the speed of air in the air passageway (86), with a simple structure. Further, it is possible to generate a differential pressure in the air passageway (86) in a simple and easy manner. Moreover, it is possible to easily generate, in the air passageway (86), an air speed and a differential pressure which fall within the measurement ranges of the air speed sensor (101) and the differential pressure sensor (111), by simply changing the aperture of the passageway opening/closing means (82). For example, in the case where the measurement sensitivity of the air speed sensor (101) and the differential pressure sensor (111) is low, an air speed and a differential pressure in the air passageway (86) can be increased by decreasing the aperture of the passageway opening/closing means (82). On the other hand, in the case where the measurement sensitivity of the air speed sensor (101) etc. is high, an air speed and a differential pressure in the air passageway (86) can be decreased by increasing the aperture of the passageway opening/closing means (82). This structure allows an increase in flexibility in the choice of the air speed sensor (101) and the sensor body (111).

According to the eleventh aspect of the present invention, as in the sixth aspect of the present invention, the air blown by the indoor fan (21) is introduced in the storage portion (62) to transfer dust. Therefore, dust can be easily transferred from the storage portion (62) to the dust collecting box (90) without individually providing transfer means. Further, as in the tenth aspect of the present invention, the passageway opening/closing means (82) is provided in the air passageway (86). Therefore, for example during a general operation in which the air filter (30) is not cleaned, the passageway opening/closing means (82) is full closed, thereby making it possible to supply all of the air blown by the indoor fan (21) into the indoor heat exchanger (22). As a result, it is possible to prevent a decrease in comfort of the resident.

Further, according to the eleventh aspect of the present invention, to detect a full condition of the dust collecting box (90), the passageway opening/closing means (82) is fully closed so that the air blown by the indoor fan (21) can be introduced into the storage portion (62) through the bypass passage (106). The flow passage area of the bypass passage (106) is smaller than the flow passage area of the air passageway (86), and therefore, the speed of air in the bypass passage (106) is relatively greater than the speed of air in the air passageway (86). Thus, the air speed sensor (107) provided in the bypass passage (106) can reliably detect an air speed and change in the air speed. As a result, the accuracy in detecting the full condition of the dust collecting box (90) can be improved.

According to the twelfth aspect of the present invention, the air which is blown by the indoor fan (21) and which has not yet flowed into the indoor heat exchanger (22) is introduced into the air storage portion (62). Thus, during a cooling operation for example, the air before being cooled by the indoor heat exchanger (22) is introduced into the storage portion (62). Therefore, condensation on the storage portion (62) because of cool air can be avoided. Therefore, the full condition detection means (70) can be protected from condensation. As a result, reliability can be further increased. Also, because there is no need to provide separate means for preventing condensation, reduction in cost and size can be achieved.

BRIEF DESCRIPTION OF THE DRAWINGS

FIG. 12(A) and FIG. 12(B) illustrate a state in a filter cleaning operation, and FIG. 12(C) illustrates a state in a general operation.

Figure 1:
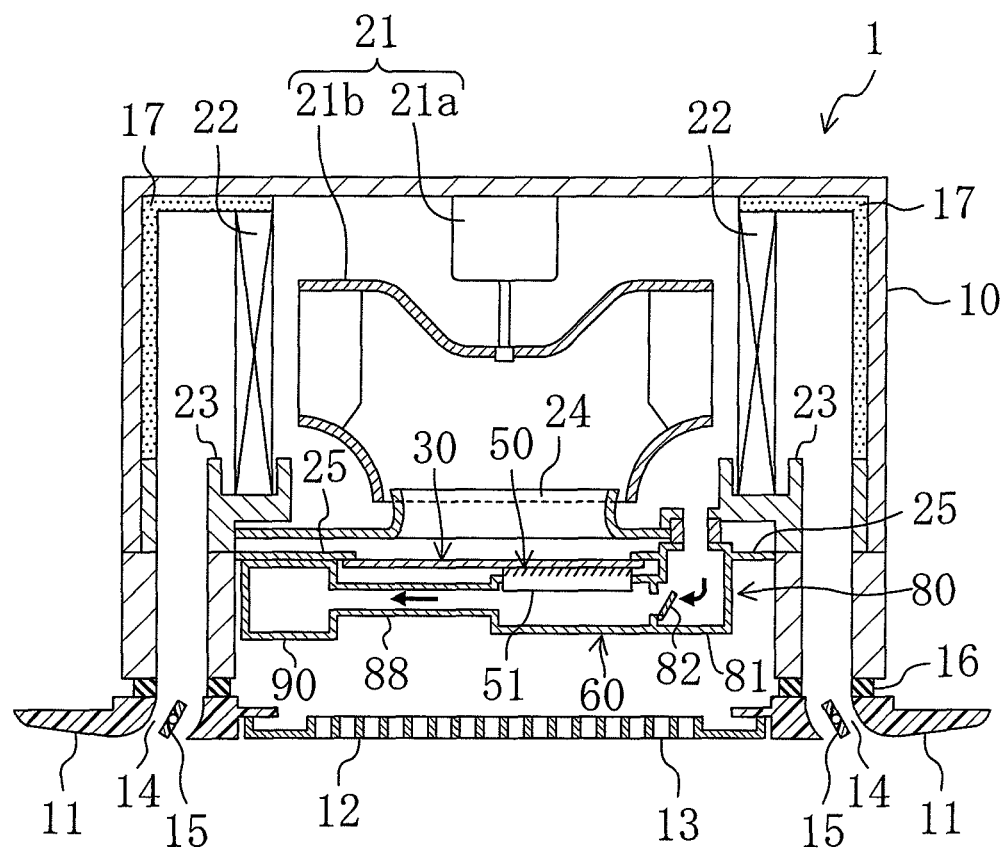
FIG. 1 is a vertical cross-section of a structure of an indoor unit according to the first embodiment.

DESCRIPTION OF REFERENCE CHARACTERS 1 indoor unit
10 casing
21 indoor fan
22 indoor heat exchanger
30 air filter
50 dust removal means
60 dust storage container
62 storage portion
64 first opening (opening)
65 second opening (opening)
70 full condition detection means
71 sensor box (housing)
72 LED (light emitting portion)
73 phototransistor (light receiving portion) photodiode (light receiving portion)
80 dust transfer means
82 damper (passageway opening/closing means, throttle portion)
86 introduction duct (air passageway)
90 dust collecting box
101 air speed sensor
106 bypass passage
107 air speed sensor
111 sensor body (differential pressure sensor)
Description Of Embodiments embodiments of the present invention will be described in detail hereinafter with reference to the drawings.

<First Embodiment>

The first embodiment of the present invention will be described. An indoor unit (1) of the present embodiment is included in an air conditioner, and is mounted in the ceiling of a room. The air conditioner includes a refrigerant circuit formed by connecting by pipes a compressor, an outdoor heat exchanger, and an expansion valve, which are provided in the outdoor unit, and an indoor heat exchanger (22) provided in the indoor unit (1). In the refrigerant circuit, a refrigerant circulates in both directions to perform a vapor compression refrigeration cycle. The air conditioner performs a cooling operation in which the indoor heat exchanger (22) serves as a evaporator in the refrigerant circuit, and a heating operation in which the indoor heat exchanger (22) serves as a compressor in the refrigerant circuit.

<Structure of Indoor Unit>

Figure 2:
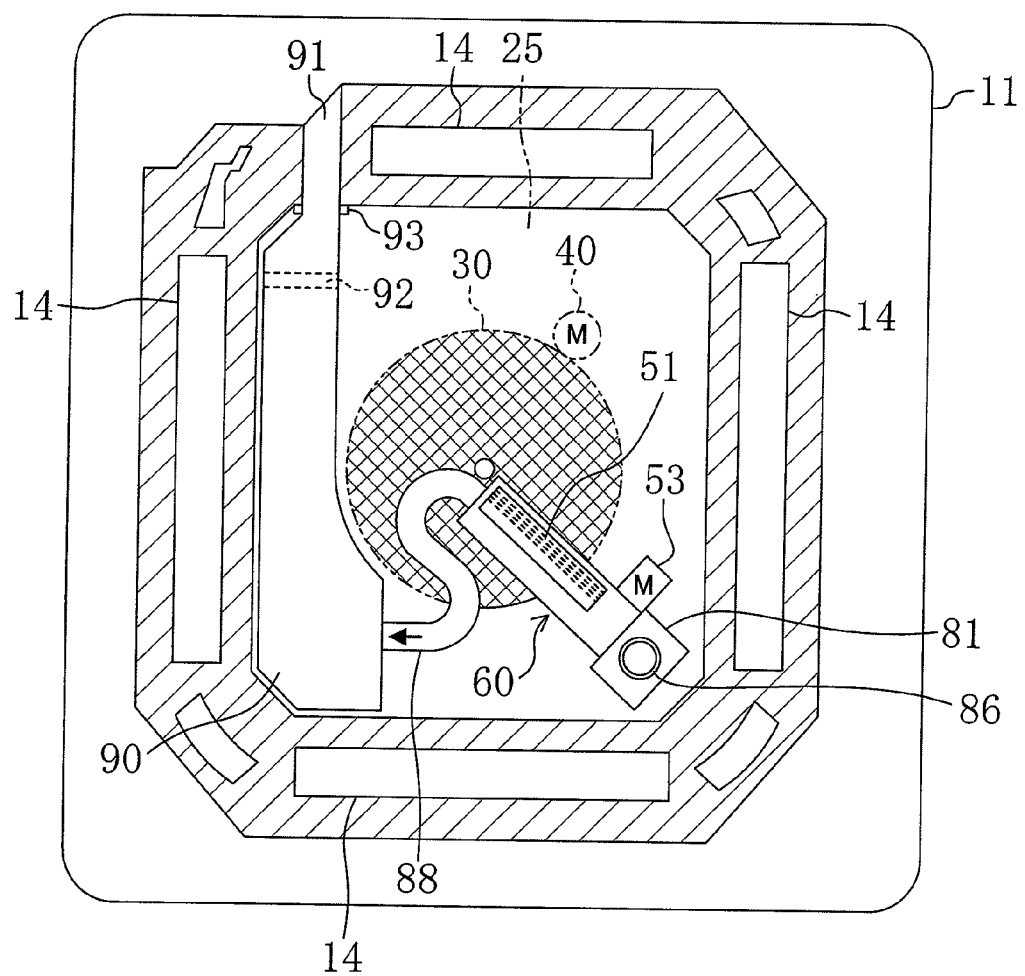
FIG. 2 is a horizontal cross-section of a structure of the indoor unit according to the first embodiment, viewed from above.

As shown in FIGS. 1 and 2, the indoor unit (1) has a casing (10) and a decorative panel (11). An indoor heat exchanger (22), a drain pan (23), an indoor fan (21), an air filter (30), filter drive means (40), dust removal means (50), a dust storage container (60), dust transfer means (80), and a dust collecting box (90) are provided in the casing (10).

The casing (10) has a generally rectangular parallelepiped, box-like shape, which is open on the bottom side. A heat insulation (17) is stacked in the inner surface of the casing (10). The casing (10) is mounted such that the bottom portion of the casing (10) is inserted in an opening in the ceiling board.

The decorative panel (11) has a rectangular plate-like shape. The decorative panel (11) in plan view is slightly bigger than the casing (10) in plan view. The decorative panel (11) is attached to the casing (10) such that the decorative panel (11) covers the bottom side of the casing (10), with a sealing member (16) interposed between the decorative panel (11) and the casing (10). The decorative panel (11) attached to the casing (10) is exposed to the interior of the room.

The decorative panel (11) is provided with one inlet (13) and four outlets (14). The inlet (13) has a rectangular shape and is located in a central portion of the decorative panel (11). An inlet grill (12) having slits is fitted in the inlet (13). Each outlet (14) has an elongated rectangular shape, and is provided along each side of the decorative panel (11). Each outlet (14) is provided with a wind direction control plate (15). The wind direction control plate (15) is configured to rotate and thereby adjusts the direction of wind (blowout direction).

The indoor fan (21) is a so-called "turbo fan." The indoor fan (21) is located at a generally central location of the casing (10), and positioned above the inlet (13). The indoor fan (21) has a fan motor (21a) and an impeller (21b). The fan motor (21a) is fixed to the top plate of the casing (10). The impeller (21b) is connected to the shaft of the fan motor (21a). A bell mouth (24) is provided under the indoor fan (21), and communicates with the inlet (13). In the casing (10), the bell mouth (24) partitions the space on the upstream side of the indoor heat exchanger (22) into a space on the indoor fan (21) side and a space on the inlet grill (12) side. The indoor fan (21) is configured to blow out, in a circumferential direction, the air having been drawn through the bell mouth (24) from a space below.

The indoor heat exchanger (22) is formed by a fin-and-tube heat exchanger of cross-fin type. The indoor heat exchanger (22) has a generally square shape in plan view, and is arranged to surround the indoor fan (21). The indoor heat exchanger (22) exchanges heat between the refrigerant and room air (blown air) transferred from the indoor fan (21).

The drain pan (23) is placed under the indoor heat exchanger (22). The drain pan (23) is for receiving drain water generated as a result of condensation of water vapor in the air at the indoor heat exchanger (22). The drain pan (23) is provided with a drain pump (not shown) for draining drain water. The drain pan (23) is inclined so that the drain water is collected at a place where the drain pump is provided.

A partition plate (25) is provided under the bell mouth (24). The partition plate (25) partitions a space between the bell mouth (24) and the inlet grill (12) into upper and lower spaces. That is, the partition plate (25) separates the space on the upstream side of the indoor heat exchanger (22) into a space on the indoor heat exchanger (22) side, the space including the bell mouth (24), and a space on the inlet grill (12) side.

Figure 3:
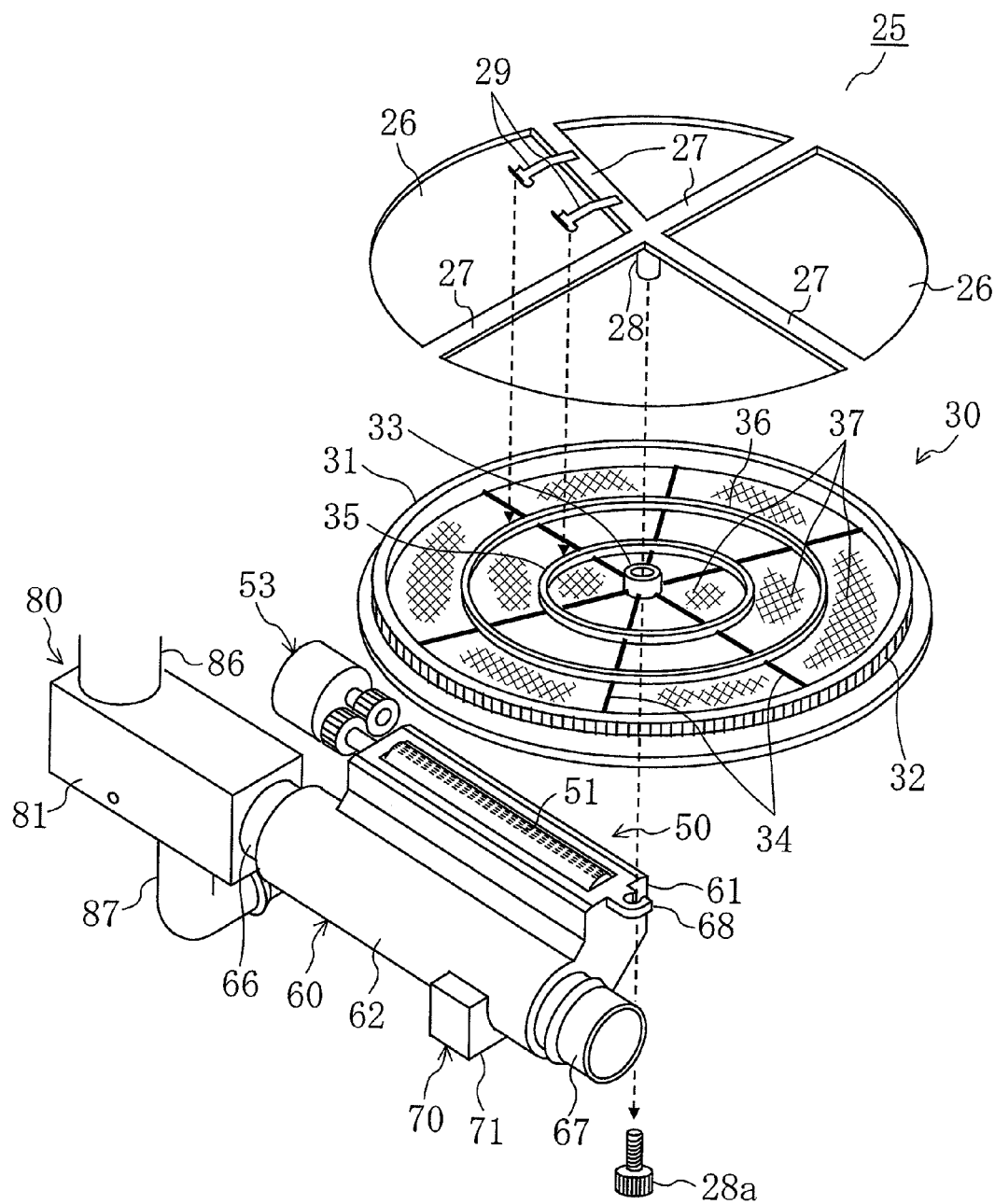
FIG. 3 is an oblique view of structures of a partition plate, an air filter and a dust storage container according to the first embodiment.

An air vent (26) for allowing the air taken through the inlet (13) to flow into the bell mouth (24) is formed in the central portion of the partition plate (25). As shown in FIG. 3, the air vent (26) is a circular hole which is divided into sectors by four radial members (27) extending in a radial direction of the hole. The radial members (27) are connected to each other at the center of the circular hole, and the center of the circular hole is provided with a cylindrical filter turning shaft (28) which protrudes downward. The filter turning shaft (28) is a rotating shaft for rotating the air filter (30). Further, one of the radial members (27) is provided with two filter pressing members (29).

As shown in FIG. 3, the air filter (30) is placed under the partition plate (25), and has a disk-like shape for covering the inlet of the bell mouth (24). Specifically, the air filter (30) has a ring-shaped filter body (31) and a mesh member (37). The outer peripheral surface of the filter body (31) is provided with a gear (32). The center of the ring-shaped filter body (31) is provided with a cylindrical shaft insertion portion (33) supported by six radial ribs (34). In other words, each radial rib (34) extends in a radial direction from the shaft insertion portion (33). Further, the inner side of the filter body (31) is provided with an inner circumferential rib (35) and an outer circumferential rib (36) which have a ring shape and which are concentric with the filter body (31). The diameter of the outer circumferential rib (36) is larger than the diameter of the inner circumferential rib (35). The mesh member (37) is stretched over the filter body (31). The air taken through the inlet (13) passes through the mesh member (37) of the air filter (30), and flows into the bell mouth (24). Here, the dust in the air is captured by the mesh member (37).

Further, the air filter (30) is biased downward by the above-described filter pressing members (29) which abut on each circumferential rib (35, 36). Thus, the air filter (30) is pressed against a rotating brush (51) of dust removal means (50), described later. With this structure, the dust removal efficiency of the dust removal means (50) can be improved.

Figure 4:
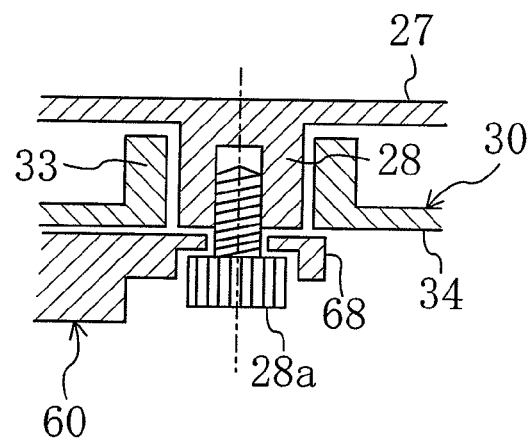
FIG. 4 is a cross-section of an attachment portion of the air filter according to the first embodiment.

As shown in FIG. 4, the air filter (30) is attached by fitting the shaft insertion portion (33) to the filter turning shaft (28) of the partition plate (25). The air filter (30) can rotate about the filter turning shaft (28). The dust storage container (60) is positioned under the air filter (30). A filter attachment portion (68) of the dust storage container (60) is fastened, with a fastening screw (28a), to the shaft insertion portion (33) of the partition plate (25), with the filter turning shaft (28) inserted in the shaft insertion portion (33) of the air filter (30). The air filter (30) is held between the partition plate (25) and the dust storage container (60) in this way.

Filter drive means (40) for rotating the air filter (30) is provided at a location close to the air filter (30) (see FIG. 2). This means that the filter drive means (40) includes moving means for relatively moving the air filter (30) and the rotating brush (51).

Figure 5:
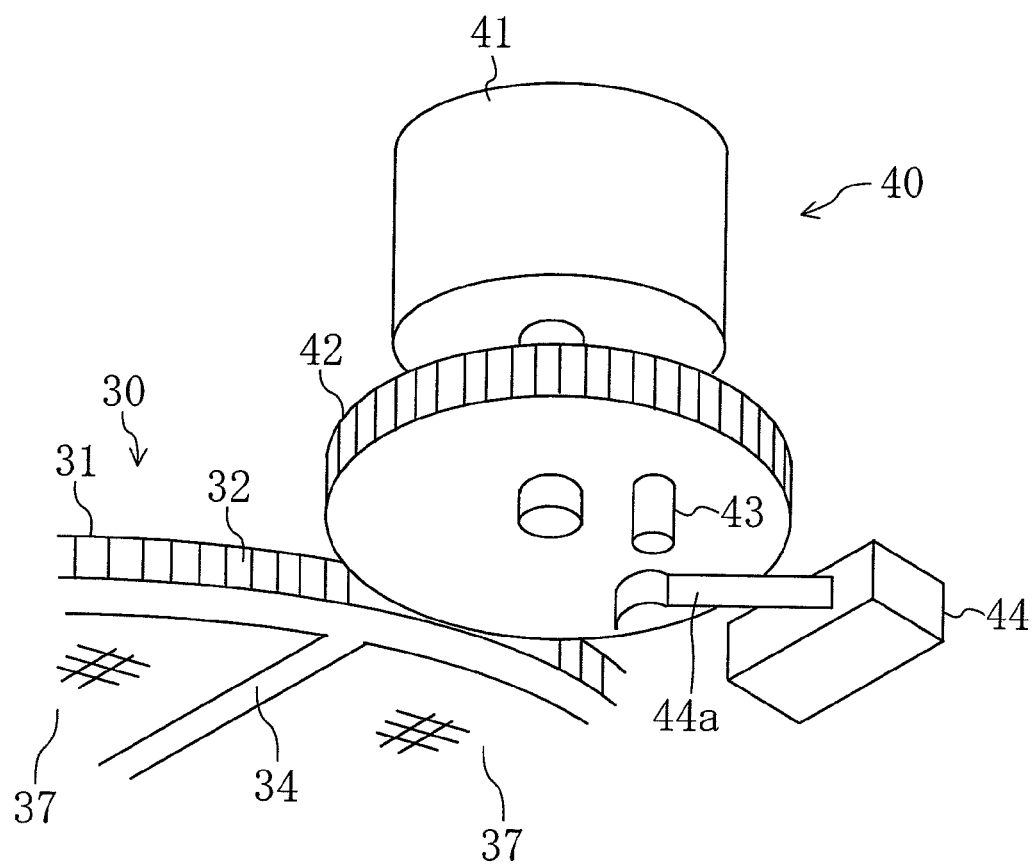
FIG. 5 is an oblique view of a structure of filter drive means according to the first embodiment.

Specifically, the filter drive means (40) includes a filter drive motor (41) and a limit switch (44) as shown in FIG. 5. The drive shaft of the filter drive motor (41) is provided with a drive gear (42), which engages with the gear (32) of the filter body (31). One end surface of the drive gear (42) is provided with a switch actuating portion (43) which is a protrusion. The switch actuating portion (43) acts on a lever (44a) of the limit switch (44) due to rotation of the drive gear (42). When the switch actuating portion (43) acts on the lever (44a), the limit switch (44) detects it. In other words, the switch actuating portion (43) and the limit switch (44) are for detecting the rotational position of the drive gear (42).

Next, the dust removal means (50), the dust storage container (60), and the dust transfer means (80) will be described with reference to FIGS. 6-11. The dust removal means (50), the dust storage container (60), and the dust transfer means (80) are positioned under the partition plate (25) and the air filter (30) (see FIG. 1 and FIG. 2).

The dust removal means (50) is for removing dust captured by the air filter (30). The dust removal means (50) includes the rotating brush (51) and a cleaning brush (52), and a brush drive means (53).

Figure 8:
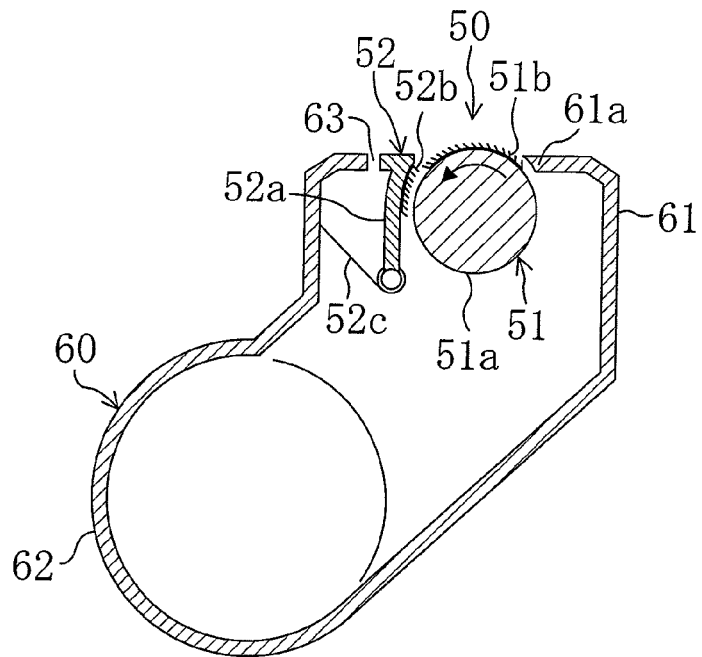
FIG. 8 is a horizontal cross-section of a structure of the dust storage container according to the first embodiment.

As shown in FIG. 8, the rotating brush (51) and the cleaning brush (52) is provided in a brush opening (63) of the dust storage container (60), described later.

The rotating brush (51) includes an elongated, cylindrical shaft (51a) and a brush (51b) located on the outer peripheral surface of the shaft (51a). The brush (51b) is formed by a plurality of piles. The brush (51b) is provided on part of the shaft (51a) in a circumferential direction, along a lengthwise direction of the shaft (51a). The cleaning brush (52) is positioned behind the rotating brush (51).

The cleaning brush (52) includes a main portion (52a), the brush (52b), and a spring (52c). The main portion (52a) is a plate-like member, and the length of the main portion (52a) is the same as that of the shaft (51a) of the rotating brush (51). A plate surface of the main portion (52a) faces the outer peripheral surface of the rotating brush (51). Further, the upper portion of the main portion (52a) has an arc shape corresponding to the outer peripheral surface of the shaft (51a) of the rotating brush (51). The arc portion of the main portion (52a) is provided with the brush (52b) along a lengthwise direction of the main portion (52a). The spring (52c) is positioned at a lower end of the main portion (52a), and is attached to the inner wall of the dust storage container (60). In other words, the main portion (52a) is supported by the spring (52c).

Each of the rotating brush (51) and the cleaning brush (52) has a length that is equal to or longer than the radius of the air filter (30). Further, the rotating brush (51) and the cleaning brush (52) are arranged to extend radially outward from the center of the air filter (30).

Figure 6:
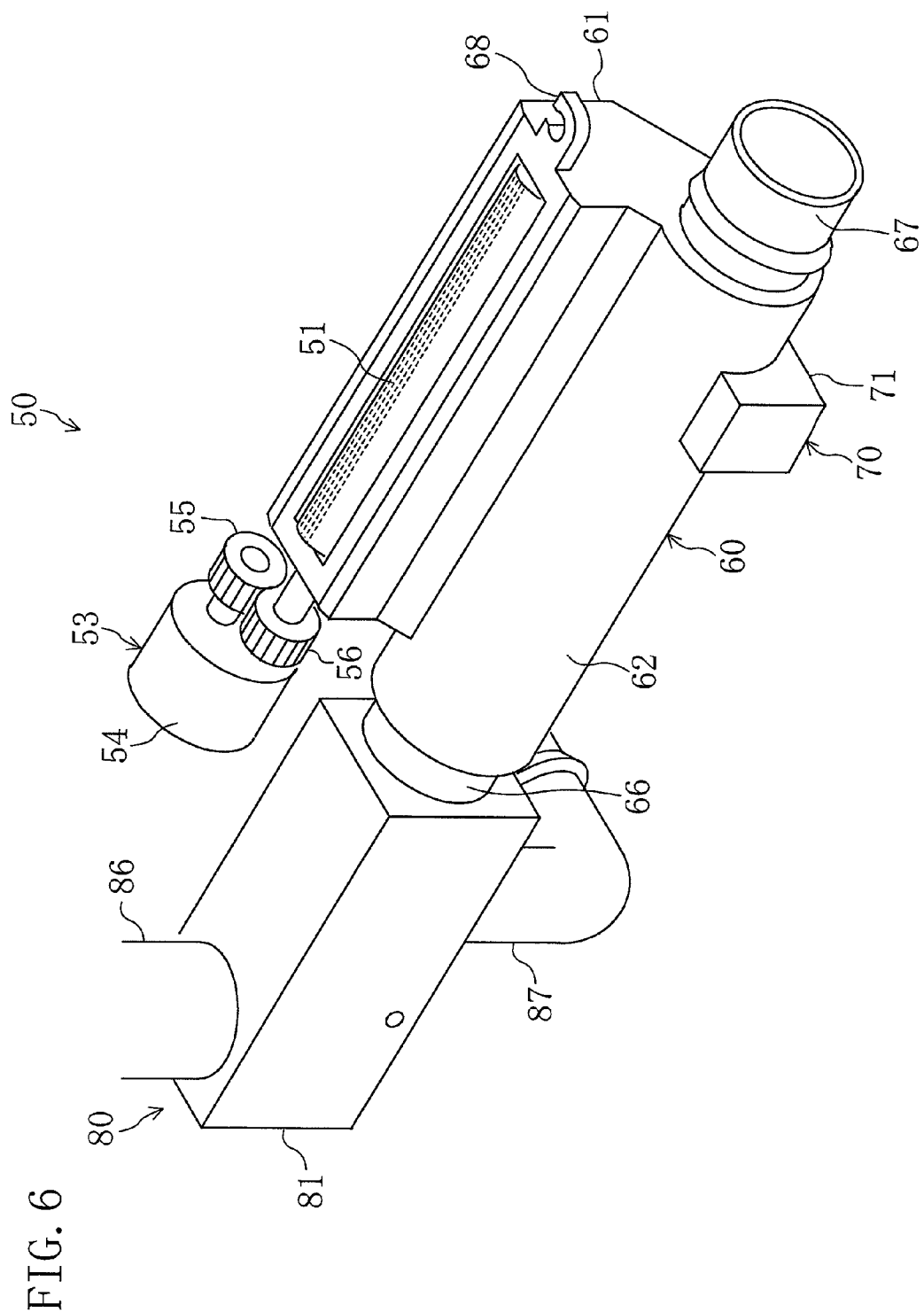
FIG. 6 is an oblique view of structures of dust removal means and a dust storage container according to the first embodiment, viewed from above.
Figure 7:
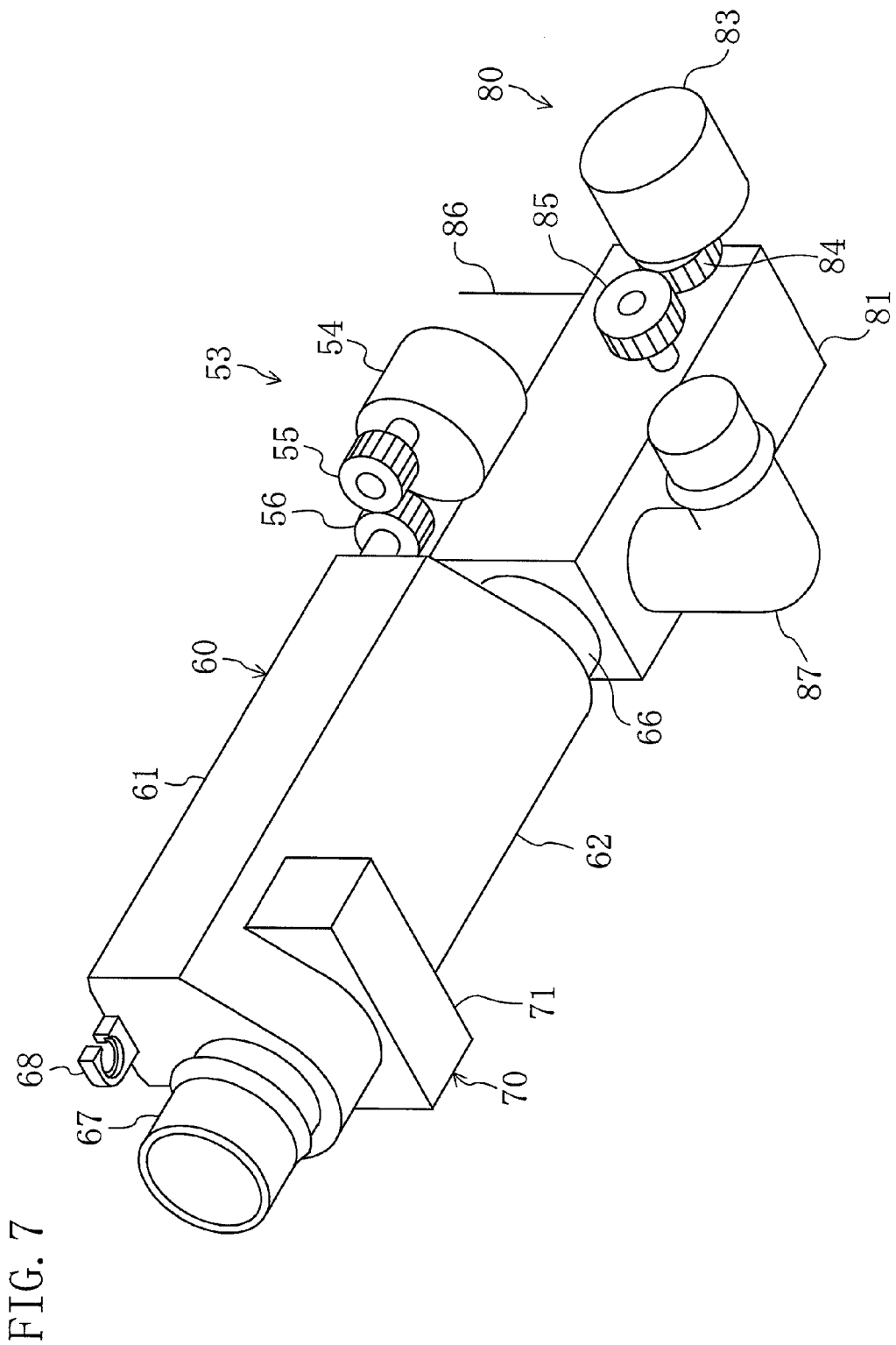
FIG. 7 is an oblique view of structures of the dust removal means and the dust storage container according to the first embodiment, viewed from below.

The brush (51b) of the rotating brush (51) comes into contact with the mesh member (37) of the rotating air filter (30), and thereby removes dust from the mesh member (37). Further, the rotating brush (51) is rotated by the brush drive means (53) in both directions. As shown in FIG. 6 and FIG. 7, the brush drive means (53) includes a brush drive motor (54), and a drive gear (55) and a driven gear (56) which are engaged with each other. The drive gear (55) is attached to a drive shaft of the brush drive motor (54). The driven gear (56) is attached to an end portion of the shaft (51a) of the rotating brush (51). This structure allows the rotating brush (51) to rotate. As will be described in detail later, the brush drive means (53) is configured to switch between a state in which the brush (51b) of the rotating brush (51) is in contact with the air filter (30) and a state in which the brush (51b) of the rotating brush (51) is spaced apart from the air filter (30), by rotating the rotating brush (51).

When the rotating brush (51) is rotated by the brush drive means (53), the brush (52b) of the cleaning brush (52) comes in contact with the brush (51b) of the rotating brush (51). The contact results in removing dust from the brush (51b) of the rotating brush (51). In other words, the cleaning brush (52) is for removing dust from the rotating brush (51) and thereby cleaning the rotating brush (51). Dust removal actions of the rotating brush (51) and the cleaning brush (52) will be described in detail later.

Further, both brushes (51b, 52b) of the rotating brush (51) and the cleaning brush (52) are made of pile fabric. The pile fabric is a plush material made on a base fabric in which yarn (pile yarn) is interwoven, and the length of the pile is relatively short. Further, the pile fabric is an inclined pile material in which pile is inclined in a certain direction.

Specifically, piles of the brush (51b) of the rotating brush (51) are inclined leftward from the shaft (51a) as shown in FIG. 8. That is, the piles of the brush (51b) are inclined in a direction opposite to the rotational direction of the air filter (30). Therefore, the rotation of the air filter (30) in the direction opposite to the direction along which the piles of the brush (51b) are inclined, enables the dust on the mesh member (37) to be efficiently scraped off. On the other hand, when the air filter (30) rotates in a direction along which the piles of the brush (51b) are inclined, the dust on the mesh member (37) is not scraped off, but in turn, dust captured in the brush (51b) is removed. Further, piles of the brush (52b) of the cleaning brush (52) are inclined downward from the main portion (52a) as shown in FIG. 8. That is, the piles of the brush (52b) are inclined in a direction opposite to a rotational direction of the rotating brush (51) when the rotating brush (51) rotates in a clockwise direction in FIG. 8.

The dust storage container (60) is for storing the dust removed from the rotating brush (51) by the cleaning brush (52), i.e., for storing the dust removed by the dust removal means (50). The dust storage container (60) is a columnar container whose side view (view from the right side of FIG. 6) is slightly bent at the middle to form an inclined V-shape. The upper portion of the dust storage container (60) is a removal section (61) at which dust on the air filter (30) is removed, and the lower portion of the dust storage container (60) is a storage portion (62) in which the dust removed from the air filter (30) is stored.

The top plate of the removal section (61) is provided with a brush opening (63) extending in a lengthwise direction of the removal section (61), and as described above, the rotating brush (51) and the cleaning brush (52) are disposed in the brush opening (63). The above-mentioned filter attachment portion (68) is provided on one side surface of the removal section (61). Further, an edge (61a) on the rear side (i.e., on the opposite side to the cleaning brush (52)) of the brush opening (63) has a tapered shape which is gradually thinned toward the rotating brush (51), and the edge surface has an arc shape along the brush (51b) of the rotating brush (51). With this structure, the space between the edge (6c) and the rotating brush (51) is reduced as much as possible. Thus, in the event that the dust on the air filter (30) is not removed by the rotating brush (51) and passes by the rotating brush (51), the dust is immediately guided in a moving direction of the air filter (30) along the edge (61a). In other words, the dust having passed by the rotating brush (51) is not obstructed by the top plate of the removal section (61), but remains adhering to the air filter (30) and moves smoothly. The edge (61a) having the above structure can prevent the dust from gathering in a space between the rotating brush (51) and the top plate of the removal section (61). If the dust gathers, the dust gradually grows to become a bigger accumulation, and is eventually flipped off from the space and falls in the room etc. This situation can be avoided according to the present embodiment. Moreover, the space between the edge (61a) and the rotating brush (51) is reduced, which therefore improves the air-tightness (sealing property) of the dust storage container (60).

The lower side (bottom side) of the storage portion (62) protrudes to have an arc shape. Dust removed from the rotating brush (51) by the cleaning brush (52) falls into the arc-shaped portion of the storage portion (62) and is stored. The storage portion (62) is open at the both ends (66, 67) in the longitudinal direction. A damper box (81) of the dust transfer means (80), described later, is connected to the first end portion (66) of the storage portion (62). A transfer duct (88) of the dust transfer means (80), described later, is connected to the second end portion (67) of the storage portion (62).

Figure 9:
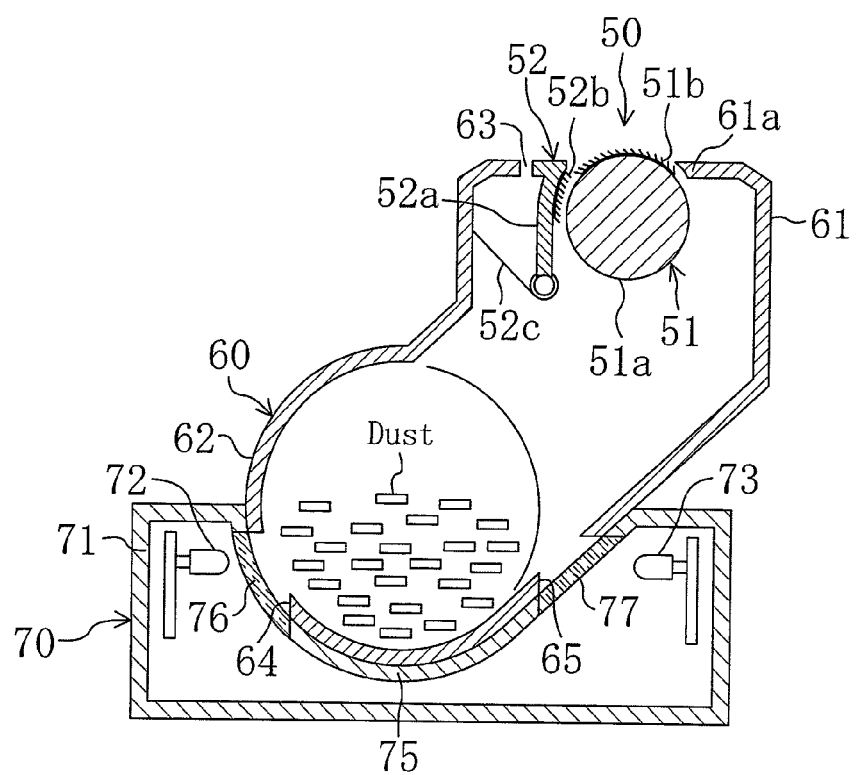
FIG. 9 is a horizontal cross-section of a structure of full condition detection means according to the first embodiment, in relation to the dust storage container.

One of the characteristics of the present invention is that the dust storage container (60) is provided with full condition detection means (70), described later, for detecting a dust full condition of the dust collecting box (90), as shown in FIG. 9. The full condition detection means (70) will be described in detail later.

The dust transfer means (80) includes an introduction duct (86), a transfer duct (88), and a suction duct (87) as shown in FIG. 2, FIG. 6, and FIG. 7.

Figure 10:
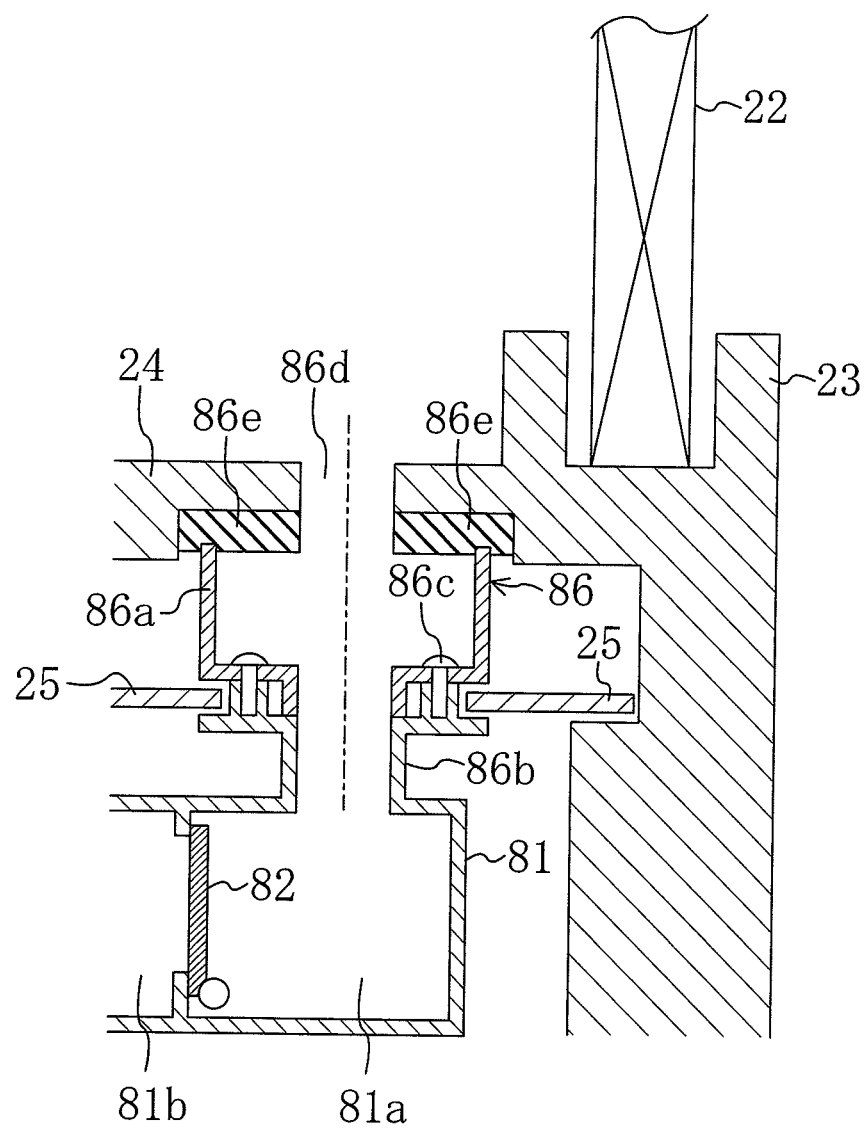
FIG. 10 is a cross-section of a structure of a main portion of dust transfer means according to the first embodiment.
Figure 11:
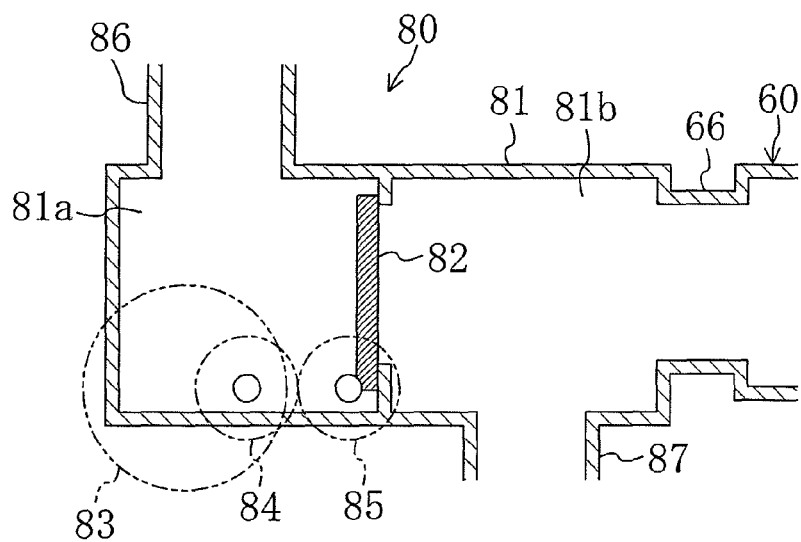
FIG. 11 shows cross-sections of a structure of a main portion of the dust transfer means according to the first embodiment.
Figure 11:
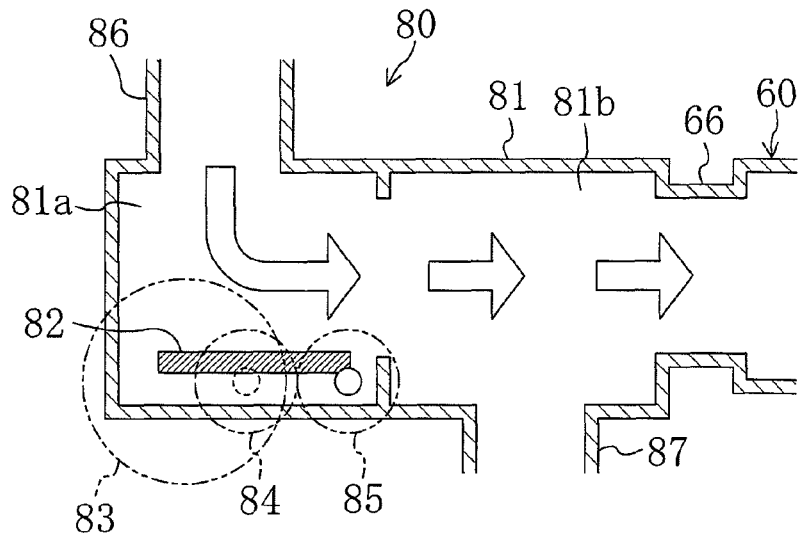
Figure 11:
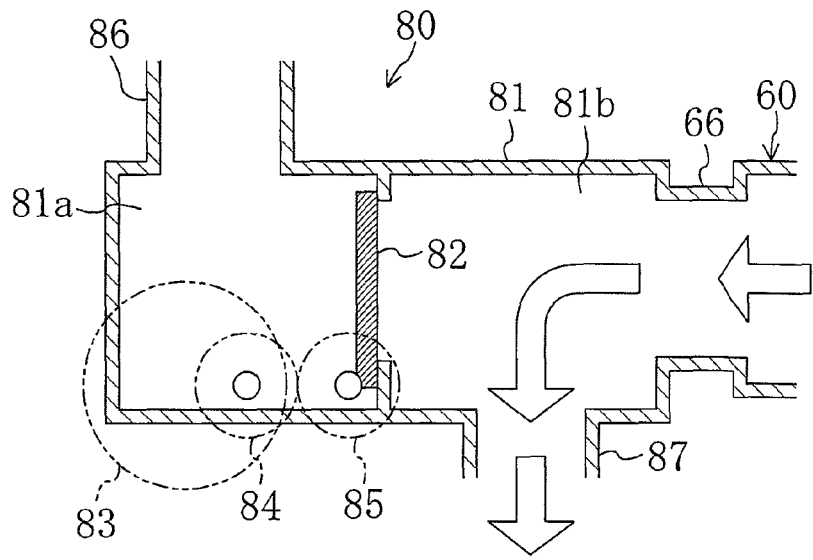

The introduction duct (86) is connected to the storage portion (62) of the dust storage container (60). An end portion of the introduction duct (86) on the storage portion (62) side forms a damper box (81). The damper box (81) has a rectangular parallelepiped shape extending in a longitudinal direction of the storage portion (62) of the dust storage container (60). The first end portion (66) of the storage portion (62) is connected to one end of the damper box (81) in the longitudinal direction. As shown in FIG. 10 and FIG. 11, one damper (82), which is passageway opening/closing means according to the present invention, is provided in the damper box (81). When the damper (82) is closed, the interior space of the damper box (81) is partitioned in the longitudinal direction. That is, the interior space of the damper box (81) is partitioned into a first chamber (81a) and a second chamber (81b). The first end portion (66) of the storage portion (62) is connected to the second chamber (81b) as described above.

As shown in FIG. 7 and FIG. 11, the dust transfer means (80) includes a damper drive motor (83), a drive gear (84), and a driven gear (85), for opening and closing the damper (82). The drive gear (84) is connected to a drive shaft of the damper drive motor (83). The driven gear (85) is connected to a rotating shaft of the damper (82). The drive gear (84) and the driven gear (85) are engaged with each other. In this structure, the rotation of the damper drive motor (83) is transferred to the rotating shaft of the damper (82) by way of the gears (84, 85). As a result, the damper (82) rotates about the rotating shaft, thereby performing opening and closing operations.

As shown in FIG. 10, part of the introduction duct (86) that extends vertically upward from the damper box (81) goes through the partition plate (25). The part of the introduction duct (86) that extends from the damper box (81) includes an upstream side duct (86a) and a downstream side duct (86b), each having a circular cross section, and the two members are connected one above the other by the fastening screw (86c). The cross-sectional area (the flow path area) of the upstream side duct (86a) is larger than the cross-sectional area (the flow path area) of the downstream side duct (86b). The lower end (the lower side in FIG. 10) of the downstream side duct (86b) is connected to the damper box (81). The upper end (the upper side in FIG. 10) of the upstream side duct (86a) is in contact with a member of the bell mouth (24) that extends horizontally, via a sealing member (86e). An introduction opening (86d) as a through hole is formed in the horizontal member of the bell mouth (24). Through this introduction opening (86d), the upstream side duct (86a) communicates with a space on the indoor fan (21) side. That is, the introduction duct (86) is for introducing air blown by the indoor fan (21) into the storage portion (62) of the dust storage container (60).

Further, the connecting portion between the upstream side duct (86a) and the downstream side duct (86b) of the introduction duct (86) is located at a through hole in the partition plate (25). Specifically, the ducts (86a, 86b) are connected to each other in such a manner that the periphery of the through hole formed in the partition plate (25) is sandwiched between a bottom plate of the upstream duct (86a) and an upper end flange of the downstream duct (86b). This connecting portion and the portion of the sealing member (86e) are configured to rotate about an axis of the introduction duct (86), with the introduction duct (86) and the dust storage container (60) moving integrally.

One end, i.e., intake side, of the suction duct (87) is connected to a bottom surface of the damper box (81) of the introduction duct (86), and communicates with the second chamber (81b). The other end, i.e., discharge side, of the suction duct (87) is connected to a cleaner insertion opening (not shown) formed in the decorative panel (11). The cleaner insertion opening is an opening to which a hose or the like of a cleaner is inserted for suction. The suction duct (87) is made of a flexible tube.

As shown in FIG. 1 and FIG. 2, one end of the transfer duct (88) is connected to the second end portion (67) of the storage portion (62) of the dust storage container (60), and the other end is connected to the dust collecting box (90), described later. The transfer duct (88) is made of a flexible tube.

The introduction duct (86) and the transfer duct (88) correspond to an air passageway according to the present invention.

In the dust transfer means (80), the damper (82) in the damper box (81) is closed during a normal operation performing heating and cooling operations (see FIG. 11 (A)). Thus, the air blown by the indoor fan (21) is not introduced in the dust storage container (60). Further, in the dust transfer means (80), the damper (82) in the damper box (81) is opened to transfer the dust in the dust storage container (60) to the dust collecting box (90) (see FIG. 11 (B)). Thus, the air blown by the indoor fan (21) is introduced to the dust storage container (60) through the introduction duct (86). As a result, the dust in the dust storage container (60) flows through the transfer duct (88) together with the air, and is transferred to the dust collecting box (90). In other words, the dust in the dust storage container (60) is discharged. Further, in the dust transfer means (80), the damper (82) in the damper box (81) is closed to discharge the dust in the dust collecting box (90) to the outside of the casing (10) (see FIG. 11 (C)). In this case, the dust in the dust collecting box (90) is suctioned by a cleaner from the cleaner insertion opening through the transfer duct (88), the damper box (81) and the suction duct (87). That is, the dust transfer means (80) is configured to transfer the dust in the dust storage container (60) to the dust collecting box (90) by utilizing the air blown by the indoor fan (21).

As shown in FIG. 1 and FIG. 2, the dust collecting box (90) is for storing dust transferred from inside the dust storage container (60) as described above. The dust collecting box (90) has a slightly elongated, generally rectangular parallelepiped shape, and is located under the partition plate (25) like the dust storage container (60). The dust collecting box (90) is located along one side of the partition plate (25) so that the dust collecting box (90) does not overlap with the air filter (30) in plan view. With this structure, flow of the air drawn from the inlet grill (12) is not obstructed by the dust collecting box (90). One end of the dust collecting box (90) that is opposite to the end to which the transfer duct (88) is connected, is provided with a discharge opening (91). The discharge opening (91) goes through the casing (10) and communicates with the room. A sealing member (93) is disposed at the portion at which the discharge opening (91) goes through the casing (10).

The dust collecting box (90) is configured such that the area of the discharge opening (91) in plan view is smaller than the other area of the dust collecting box (90) in plan view. Further, the side plate of the dust collecting box (90) that is on the air filter (30) side has an arc shape so as to correspond to the outer periphery of the air filter (30). Moreover, a filter (92) is disposed in a dust collecting box (90) at a location close to the discharge opening (91). The air in the dust collecting box (90) is discharged through the discharge opening (91) when dust is transferred from the air dust storage container (60). Here, because of the provision of the filter (92), the transferred dust does not flow out from the discharge opening (91). Further, when the dust is discharged from the dust collecting box (90) by the suction of a cleaner, room air flows into the dust collecting box (90) through the discharge opening (91). Dust in the air which flows into the dust collecting box (90) is captured by the filter (92). With this structure, the pressure in the dust collecting box (90) is properly balanced by the intake and discharge of air through the discharge opening (91). Thus, the dust transfer operation to the dust collecting box (90) and the dust discharge operation from the dust collecting box (90) are properly done.

The full condition detection means (70) includes a sensor box (71). The sensor box (71) is provided closer to the second end portion (67) of the storage portion (62) of the dust storage container (60) (see FIG. 6 and FIG. 7). The sensor box (71) extends in a transverse direction of the storage portion (62), and covers a bottom portion of the storage portion (62).

Moreover, the wall surface (storage wall) of the storage portion (62) that is covered by the sensor box (71) is provided with two openings (64, 65). The first opening (64) and the second opening (65) are opposed to each other. These two openings (64, 65) are for allowing light emitted by an LED (72), described later, to pass through (transmit).

Two transparent windows (76, 77) are formed in the arc member (75) of the sensor box (71), the arc member (75) covering the storage wall of the storage portion (62). The first transparent windows (76) and the second transparent window (77) are disposed such that they close the first opening (64) and the second opening (65) of the storage portion (62), respectively. In other words, the sensor box (71) closes the openings (64, 65) of the storage portion (62), and forms a housing according to the present invention.

The LED (72) and the phototransistor (73) are accommodated in the sensor box (71). The LED (72) is positioned at a location that corresponds to the first transparent windows (76) and the first opening (64). The phototransistor (73) is positioned at a location that corresponds to the second transparent window (77) and the second opening (65). That is, the LED (72) and the phototransistor (73) are opposed to each other, with the storage portion (62) interposed therebetween in the transverse direction of the storage portion (62).

According to the full condition detection means (70), light emitted from the LED (72) passes through the first transparent window (76) and the first opening (64), and thereafter, passes through the second opening (65) and the second transparent window (77), in this order, and is received in the photo transistor (73). In the phototransistor (73), intensity of light received in the phototransistor (73) is detected. The amount of dust stored in the storage portion (62) (i.e., the degree of filling) is detected according to the light intensity which has been detected. In other words, if the amount of dust stored is small, transmittance of light (amount of transmission) from the first transparent window (64) to the second transparent window (65) in the storage portion (62) is high, and therefore, intensity of light to be detected will be high. In contrast, if the amount of dust stored is large, transmittance of light (amount of transmission) from the first transparent window (64) to the second transparent window (65) in the storage portion (62) is low, and therefore, intensity of light to be detected will be low. Therefore, according to the full condition detection means (70), it is possible to determine that the dust collecting box (90) is full of dust if the light intensity detected by the phototransistor (73) is equal to or lower than a predetermined value, which means the dust remains in the storage portion (62) of the dust storage container (60), even after a dust transfer operation is performed by the dust transfer means (80) as described above. The full condition detection means (70) of the present embodiment is configured to detect the amount of dust stored in storage portion (62), based on the amount of transmission of light through the storage portion (62), and to detect a dust full condition of the dust collecting box (90).

The LED (72) and the phototransistor (73) respectively correspond to a light emitting portion and a light receiving portion according to the present invention. Further, the phototransistor (73) may be replaced by a photodiode according to the present embodiment.

—Operational Behavior—

Now, an operational behavior of the indoor unit (1) will be described with reference to FIGS. 12-14. The indoor unit (1) is configured to be capable of switching between a general operation which performs cooling and heating operations, and a filter cleaning operation for cleaning the air filter (30).

<General Operation>

Figure 12:
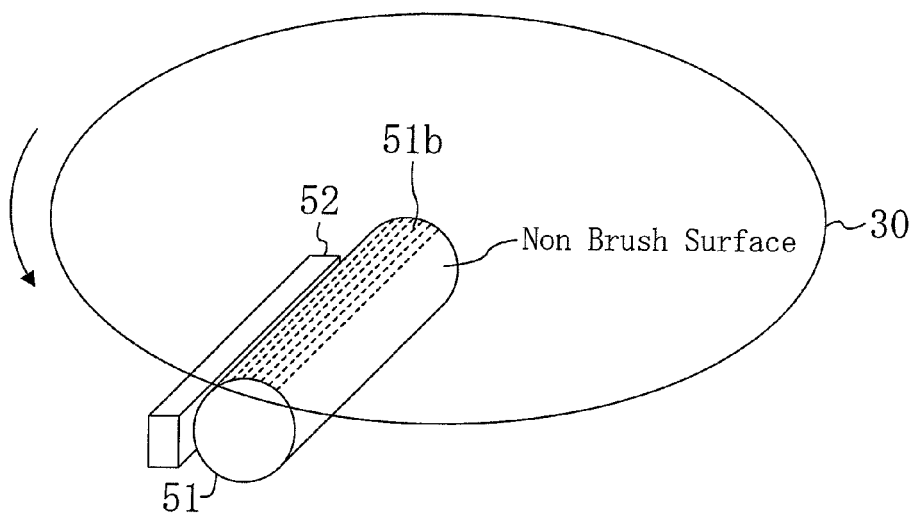
FIG. 12 illustrates schematic views for showing a relationship between an air filter and dust removal means according to the first embodiment.
Figure 12:
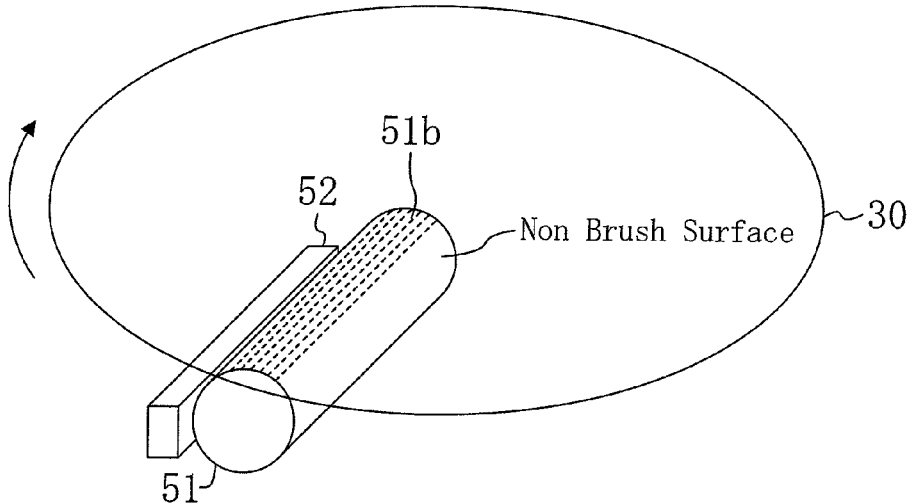
Figure 12:
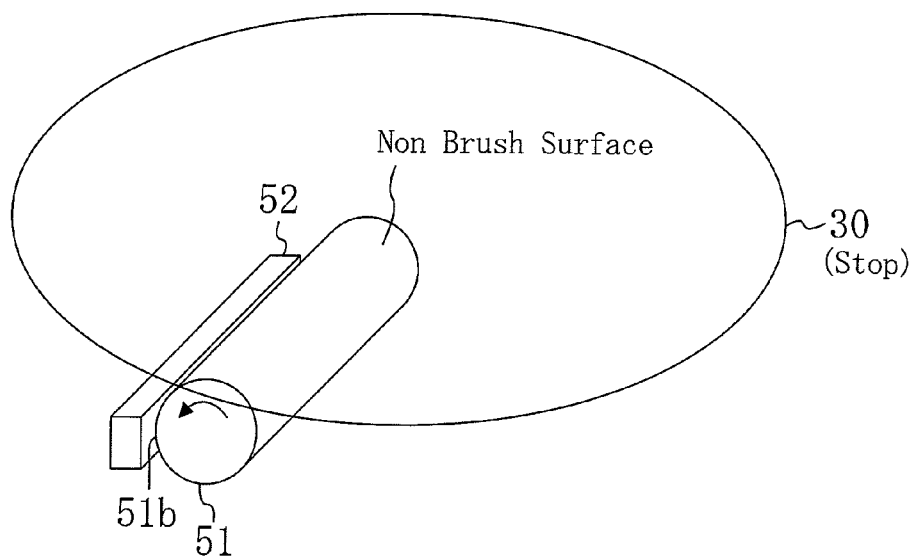
Figure 13:
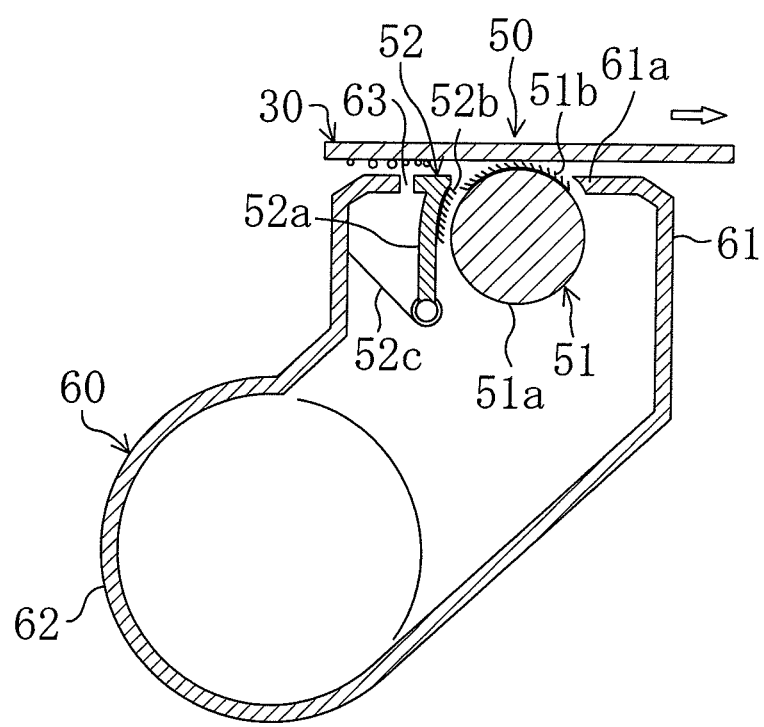
FIG. 13 illustrates a horizontal cross-section for showing a relationship between the air filter and the dust removal means in a dust removal operation according to the first embodiment.

To perform a general operation, as shown in FIG. 12 (C), the rotating brush (51) is rotated so that the brush (51b) of the rotating brush (51) can be positioned on the cleaning brush (52) side. in other words, the rotating brush (51) is rotated until the brush (51b) of the rotating brush (51) is not in contact with the air filter (30) so that the non brush surface (i.e., the outer peripheral surface of the shaft (51a) on which no brush (51b) is provided) of the rotating brush (51) faces the air filter (30). Further, the damper (82) of the damper box (81) is fully closed (the state as shown in FIG. 11 (A)). Here, the air filter (30) is stopped.

The indoor fan (21) is actuated in this state. Then, in the indoor unit (1), room air taken through the inlet (13) passes through the air filter (30) and flows into the bell mouth (24). When the air passes through the air filter (30), dust in the air is captured by the mesh member (37) of the air filter (30). The air having flowed into the bell mouth (24) is blown out by the indoor fan (21). The blown air is cooled or heated by heat exchange with the refrigerant of the indoor heat exchanger (22), and is then supplied into the room through each outlet (14). The room air is cooled or heated in this way.

As described above, the damper (82) of the damper box (81) is closed during a general operation, and therefore, the air blown by the indoor fan (21) is not introduced into the storage portion (62) of the dust storage container (60) through the introduction duct (86). That is, introduction of air into the storage portion (62) of the dust storage container (60) is inhibited.

Further, during a general operation, the brush (51*b*) of the rotating brush (51) and the air filter (30) are not in contact with each other. That is, the brush (51*b*) is spaced apart from the air filter (30). Therefore, it is possible to avoid the deterioration of the brush (51*b*) due to the state in which the brush (51*b*) is always touching the air filter (30). As a result, the durability of the rotating brush (51) is increased.

<Filter Cleaning Operation>

During the filter cleaning operation, the operation of the compressor is stopped, and the refrigerant does not circulate in the refrigerant circuit. The filter cleaning operation is capable of switching between a dust removal operation, a brush cleaning operation, a dust transfer operation, a full condition detection operation, and a dust discharge operation.

The dust removal operation is an operation for removing dust captured by the air filter (30). The brush cleaning operation is an operation for removing dust captured by the rotating brush (51). The dust transfer operation is an operation for transferring dust from the dust storage container (60) to the dust collecting box (90). The full condition detection operation is an operation for detecting a dust full condition of the dust collecting box (90). The dust discharge operation is an operation for discharging dust from the dust collecting box (90) to the outside of the casing (10).

According to the present embodiment, the dust removal operation and the brush cleaning operation are performed alternately. First, the indoor fan (21) is stopped to perform the dust removal operation. Then, as shown in FIG. 12 (A), the rotating brush (51) is rotated to have the brush (51*b*) of the rotating brush (51) come in contact with the air filter (30). In this state, the air filter (30) is turned in a direction indicated by the arrow in FIG. 12 (A) (in a counterclockwise direction). That is, the air filter (30) moves in the direction indicated by the arrow (white arrow) in FIG. 13, opposing to the direction of the piles of the brush (51*b*) of the rotating brush (51). Here, the rotation of the rotating brush (51) is stopped.

Figure 14:
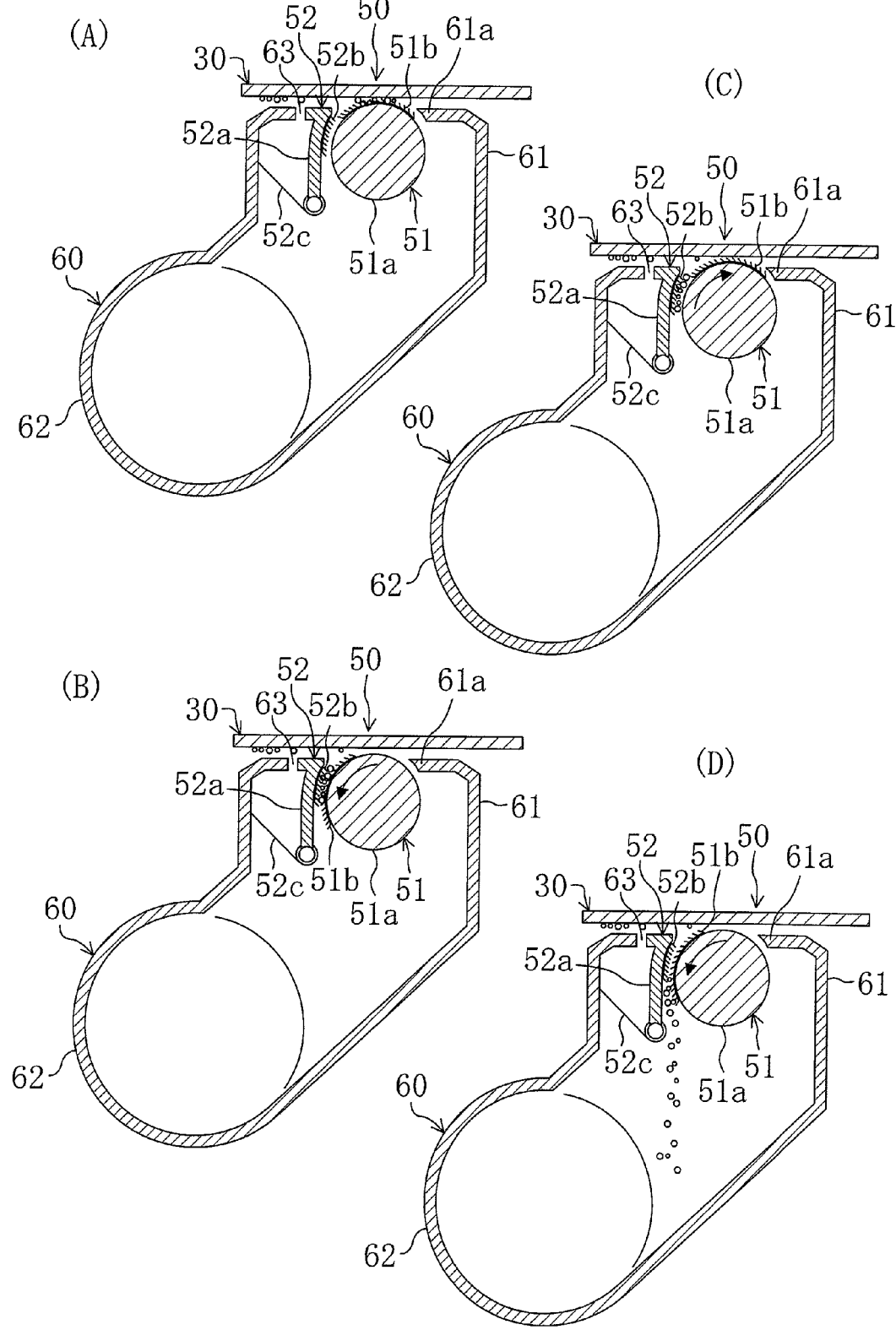
FIG. 14 shows horizontal cross-sections for showing an operation of the dust removal means in a brush cleaning operation according to the first embodiment.

In this way, the dust on the air filter (30) is captured by the brush (51*b*) of the rotating brush (51) (see FIG. 14 (A)). When the lever (44*a*) of the limit switch (44) of the filter drive means (40) moves, the filter drive motor (41) is stopped, and the air filter (30) is stopped. In other words, the air filter (30) turns at a predetermined angle and stops. Thus, the dust is removed from an area of the air filter (30) which the brush (51*b*) of the rotating brush (51) passes through. Here, the piles of the brush (51*b*) are inclined in a direction opposite to the rotational direction (moving direction) of the air filter (30), and therefore, the dust on the air filter (30) can be easily scraped off by the brush (51*b*). Thus, the efficiency of the dust removal operation by the rotating brush (51) is increased. When the air filter (30) is stopped, the operation is switched from the dust removal operation to the brush cleaning operation.

In the brush cleaning operation, the indoor fan (21) and the rotating brush (51) are still stopped, and the air filter (30) turns in a direction indicated by the arrow in FIG. 12 (B) (in a clockwise direction). In other words, the air filter (30) turns in a direction opposite to the direction in the dust removal operation, that is, turns in the same direction along which the piles of the brush (51*b*) of the rotating brush (51) are inclined. According to the present embodiment, the air filter (30) turns so as to move only a distance equal to the width of the brush (51*b*) of the rotating brush (51). As a result, the dust accumulated in a space between the air filter (30) and the brush (51*b*), i.e., the dust which is almost removed from the air filter (30), adheres to the brush (51*b*) uniformly. Thus, the dust on the air filter (30) is reliably captured by the brush (51*b*). Accordingly, the dust removal efficiency of the rotating brush (51) can be improved.

Next, in the brush cleaning operation, the rotating brush (51) rotates leftward (in a counterclockwise direction) in FIG. 14, with the indoor fan (21) stopped. Here, the rotating brush (51) rotates with the dust being captured in the brush (51*b*). Further, the brushes (51*b*, 52*b*) of the rotating brush (51) and the cleaning brush (52) come in contact with each other when the rotating brush (51) rotates (see FIG. 14 (B)). When the rotating brush (51) rotates at a predetermined rotation angle, the rotating brush (51) is stopped.

After that, the rotating brush (51) rotates in a direction opposite to the above direction (i.e., rightward (in a clockwise direction) in FIG. 14). As a result, the dust captured in the brush (51*b*) of the rotating brush (51) is removed by the brush (52*b*) of the cleaning brush (52) (see FIG. 14 (C)). The dust is scraped off from the brush (51*b*) of the rotating brush (51) because the piles of the brush (52*b*) of the cleaning brush (52) are inclined downward, i.e., the piles are inclined in a direction opposite to the rotational direction of the rotating brush (51). Further, the main portion (52*a*) of the cleaning brush (52) is pushed back by the brushes (51*b*, 52*b*) coming in contacting with each other. However, the main portion (52*a*) is biased toward the rotating brush (51) by the spring (52*c*). Therefore, the brushes (51*b*, 52*b*) are not spaced apart from each other, but the cleaning brush (52) is adequately pushed against the rotating brush (51). As a result, the dust is reliably removed from the brush (51*b*) of the rotating brush (51), and the dust is captured by the brush (52*b*) of the cleaning brush (52). The rotating brush (51) rotates until it returns to the original position (the position in FIG. 14 (A)) and stops.

Then, the rotating brush (51) again rotates leftward (in a counterclockwise direction) at a predetermined rotation angle. As a result, the dust captured by the brush (52*b*) of the cleaning brush (52) is scraped off by the brush (51*b*) of the rotating brush (51), and falls in the storage portion (62) of the dust storage container (60) (see FIG. 14 (D)). The dust can be reliably scraped off from the brush (52*b*) of the cleaning brush (52) because the piles of the brush (51*b*) of the rotating brush (51) are inclined along the rotational direction. Here, the cleaning brush (52) is adequately pushed against the rotating brush (51) by the spring (52*c*) as described above, and therefore, the dust is removed from the cleaning brush (52) more reliably. The dust captured in the rotating brush (51) is removed and stored in the storage portion (62) of the dust storage container (60) as described above. After that, the rotating brush (51) again rotates rightward (in a clockwise direction) until it returns to the original position (the position in FIG. 14 (A)). The brush cleaning operation temporarily ends here.

After the above-described brush cleaning operation ends, the above-described dust removal operation is performed again. That is, the air filter (30) is turned again, and is stopped when the lever (44*a*) of the limit switch (44) is actuated again. As a result, the dust is removed from an area of the air filter (30) that is stroked by the brush (51*b*) of the rotating brush (51), and is captured by the brush (51*b*) of the rotating brush (51) (the position as shown in FIG. 14 (A)). The dust removal operation and the brush cleaning operation are alternately repeated as described above, removing the dust on the air filter (30) from an area to an area. When the dust is removed from the entire area of the air filter (30), the dust removal operation and the brush cleaning operation are completed. For example, when the lever (44*a*) of the limit switch (44) is actuated a predetermined number of times, the air filter (30) is considered as having made one turn, and the above operations are finished.

After the dust removal operation and the brush cleaning operation are finished, the operation is switched to the dust transfer operation. In the dust transfer operation, the rotating brush (51) is stopped at the position as shown in FIG. 14 (A), and at the same time, the air filter (30) is stopped. Further, the damper (82) of the damper box (81) is fully opened (the state as shown in FIG. 11 (B)). The indoor fan (21) is actuated in this state. The air blown by the indoor fan (21) is introduced into the storage portion (62) of the dust storage container (60) through the introduction duct (86). As a result, the dust in the dust storage container (60) is transferred into the dust collecting box (90) through the transfer duct (88) together with air. In the present embodiment, the dust transfer operation is stopped in a predetermined period of time. The predetermined period of time is set to a period which is deemed, for example, to allow most of the dust stored in the storage portion (62) to be transferred.

After the dust transfer operation is finished, the operation is switched to the full condition detection operation. In the full condition detection operation, the rotating brush (51) is stopped at the position as shown in FIG. 14 (A); the air filter (30) is stopped; and the damper (82) of the damper box (81) is fully opened (the state as shown in FIG. 11 (B), as in the case of the dust transfer operation. The indoor fan (21) is actuated in this state. The air blown by the indoor fan (21) sequentially flows into the storage portion (62) of the dust storage container (60) and the dust collecting box (90) through the introduction duct (86).

In the full condition detection operation, the amount of dust stored in the storage portion (62) is detected by the full condition detection means (70). Specifically, light emitted by the LED (72) is transmitted through the transparent windows (64, 65) of the storage portion (62) and the dust in the storage portion (62). The intensity of the transmitted light is detected by the phototransistor (73). If the light intensity detected by the phototransistor (73) exceeds a set value (a lower limit), it is determined that most of the dust in the storage portion (62) is transferred to the dust collecting box (90) and that almost no dust remains in the storage portion (62). In this case, it is determined that the dust collecting box (90) is not full of dust. On the other hand, if the light intensity detected by the phototransistor (73) is equal to or less than the set value (the lower limit), it is determined that a certain amount of dust remains in the storage portion (62). In this case, it is determined that the dust collecting box (90) is full of dust. Thus, according to the full condition detection means (70), if a certain amount of dust remains in the storage portion (62) even after the transfer operation by the dust transfer means (80), it is determined that the dust collecting box (90) is full of dust, and therefore that dust cannot be transferred to the dust collecting box (90). In short, in the full condition detection operation, the amount of dust stored in the storage portion (62) is detected by the full condition detection means (70), and a dust full condition of the dust collecting box (90) is detected. Further, the full condition detection means (70) is not operated in the operations other than the full condition detection operation. In other words, the LED (72) and the phototransistor (73) are operated only during the full condition detection operation. As a result, it is possible to reduce the frequency of use of the LED (72) and the phototransistor (73), which increases their lives.

Further, in the present embodiment, the full condition detection operation does not have to be performed after the completion of the dust transfer operation, but may be performed during the dust transfer operation. For example, if the light intensity detected by the phototransistor (73) does not smoothly increase during the dust transfer operation (e.g., if the detected light intensity does not change for a certain period of time), it is determined that the dust in the storage portion (62) is not transferred. In this case, it is determined that the dust collecting box (90) is full of dust.

If the full condition of the dust collecting box (90) is detected during the full condition detection operation as described above, the operation is switched to the dust discharge operation.

In the dust discharge operation, the rotating brush (51) is stopped at the position as shown in FIG. 14 (A), and the air filter (30) is stopped, as in the case of the dust transfer operation. Further, the damper (82) of the damper box (81) is closed (the state as shown in FIG. 11 (C)). In this state, a hose of a cleaner is inserted into a cleaner insertion opening in the decorative panel (11) by the user. By this suction operation, the dust in the dust collecting box (90) is suctioned into the cleaner sequentially through the transfer duct (88), the dust storage container (60), the damper box (81), and the suction duct (87). Here, the dust in the dust storage container (60) is suctioned in the cleaner through the suction duct (87) as well. As a result, the dust in the dust collecting box (90) and the dust in the dust storage container (60) are collected. In the present embodiment, the dust discharge operation may be performed freely by the user by remote control.

—Effects of First Embodiment—

According to the present embodiment, the full condition detection means (70) is provided which detects the amount of stored dust according to the intensity of light transmitted through the storage portion (62) of the dust storage container (60) (amount of transmission) to detect a full condition of the dust collecting box (90). Specifically, the full condition of the dust collecting box (90) is detected in the case where the intensity of the light transmitted through the storage portion (62) is equal to or less than a set value even after the dust transfer operation. Therefore, it is possible to recognize the full condition of the dust collecting box (90) in a simple way. As a result, it is possible to prevent the dust transfer means (80) from continuously performing the transfer operation, despite the full condition of the dust collecting box (90). This means that a dust transfer operation is not performed in vain. As a result, the dust transfer operation and the dust collection work by the dust collecting box (90) can be appropriately done.

According to the present embodiment, the intensity of light is detected by using the LED (72) and the phototransistor (73). Therefore, the full condition detection means (70) having a simple and compact structure can be achieved. In addition, despite the simple structure, it is possible to reliably determine the full condition of the dust collecting box (90).

Further, according to the present embodiment, openings (64, 65) are provided in the storage wall of the storage portion (62) of the dust storage container (60), for transmission of light emitted by the LED (72). Therefore, the dust storage container (60) can be easily manufactured. For users, it is uncomfortable if the dust in the storage portion (62) is visible from the outside, and therefore, it is preferable that the storage wall of the storage portion (62) is opaque. In this case, part of the storage wall needs to be provided with a transparent window for transmitting light emitted by the light emitting portion (72). This makes the structure of the dust storage container (60) complicated, and time and effort are required to manufacture the dust storage container (60). In view of this, the openings (64, 65) are provided in the storage wall. In this structure, light is transmitted more easily, compared to the case in which the transparent window is used, and the dust storage container (60) is manufactured easily. Since the openings (64, 65) are closed by the sensor box (71), there is no possibility of dust leakage from inside the storage portion (62).

According to the present embodiment, the air blown by the indoor fan (21) is introduced into the dust storage container (60) to transfer the dust. Thus, the dust in the dust storage container (60) can be easily transferred into the dust collecting box (90) without individually providing transfer means, such as a suction fan. As a result, efficiency in handling the dust can be improved without an increase in size of a unit and an increase in costs.

The dust storage container (60) is located under the air filter (30). Therefore, the dust storage container (60) is a resistance (an obstacle) to air flow. For this reason, it is necessary to reduce the capacity of the dust storage container (60) as much as possible. To achieve the reduction of the capacity, the dust storage container (60) cannot store a large amount of dust. However, according to the present embodiment, the dust collecting box (90) whose capacity is larger than the capacity of the dust storage container (60) is provided at a location which does not obstruct the air flow, and the dust is transferred from the dust storage container (60) to the dust collecting box (90). Therefore, it is possible to store a large amount of dust removed from the air filter (30). As a result, time and effort expended by the user in handling the dust can be reduced.

Further, as described above, the provision of the dust collecting box (90) allows the dust storage container (60) to be reduced in size as much as possible. As a result, it is possible to reduce the resistance to flow of the air taken into the indoor unit (1), and therefore, efficiency in the operation is improved.

According to the present embodiment, the air which is blown by the indoor fan (21) but not yet flows in the indoor heat exchanger (22) is introduced in the dust storage container (60). For example, in the case of the cooling operation, the air before being cooled by the indoor heat exchanger (22) is introduced in the dust storage container (60). Therefore, condensation on the dust storage container (60) because of cool air can be avoided. With this structure, electronic components such as the LED (72) and the phototransistor (73) can be protected from condensation. As a result, reliability can be further increased. Also, because there is no need to provide separate means for preventing condensation, reduction in cost and size can be achieved.

Further, in a general operation, the damper (82) is closed to prevent the air blown by the indoor fan (21) from being introduced in the dust storage container (60). This means that in the general operation, all the air blown by the indoor fan (21) can be supplied into the indoor heat exchanger (22). Therefore, the comfort of the resident is not impeded.

According to the present embodiment, the brush (51*b*) of the rotating brush (51) and the air filter (30) do not come in contact with each other during a general operation. Thus, it is possible to avoid the deterioration of the brush (51*b*) due to the state in which the brush (51*b*) touches the air filter (30) for a long time. With this structure, the durability of the rotating brush (51) can be increased, and long term dust removal capability can be achieved.

Further, according to the present embodiment, the brush (51*b*) of the rotating brush (51) is made of pile fabric. Since the length of the piles of the brush (51*b*) is short, the space for the rotating brush (51) can be saved.

Because the length of the piles of the brush (51*b*) is short, and because only part of the rotating brush (51) in a circumferential direction is provided with the brush (51*b*), the resistance to flow of the air (i.e., the air blown by the indoor fan (21)) in the dust storage container (60) can be reduced. As a result, the transfer efficiency during the dust transfer operation and the discharge efficiency during the dust discharge operation can be improved.

—Variation of First Embodiment—

Figure 15:
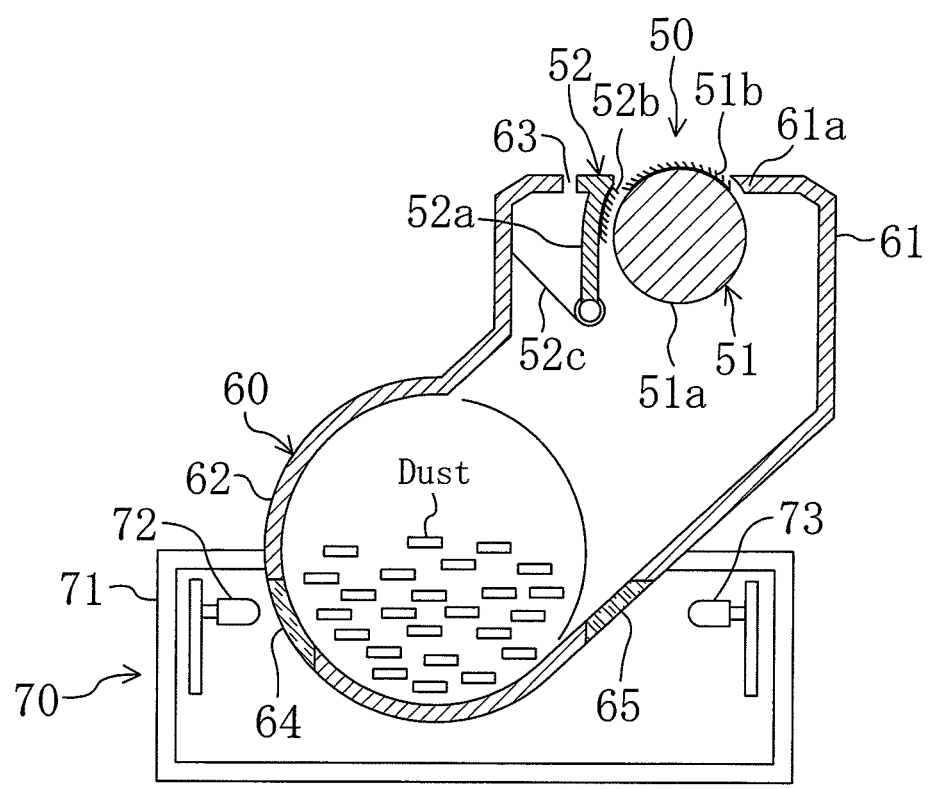
FIG. 15 shows a horizontal cross-section of a structure of full condition detection means according to a variation of the first embodiment, in relation to the dust storage container.

Now, a variation of the first embodiment will be described. In the present variation, the structures of the full condition detection means (70) and the dust storage container (60) according to the first embodiment are changed as shown in FIG. 15.

According to the first embodiment, the openings (64, 65) are formed in the storage wall of the storage portion (62). However, in the present variation, transparent windows (64, 65) are provided. Further, the sensor box (71) is attached to the storage portion (62), without providing the arc member (75). That is, in the present variation, light emitted by the LED (72) is transmitted through the first transparent window (64) and the second transparent window (65) of the storage portion (62), in this order, and is received in the phototransistor (73). The other structures, operations and effects are the same as those in the first embodiment.

<Second Embodiment>

The second embodiment of the present invention will be described. An indoor unit (1) of the present embodiment has a structure in which the full condition detection means (70) according to the first embodiment is changed.

Figure 16:
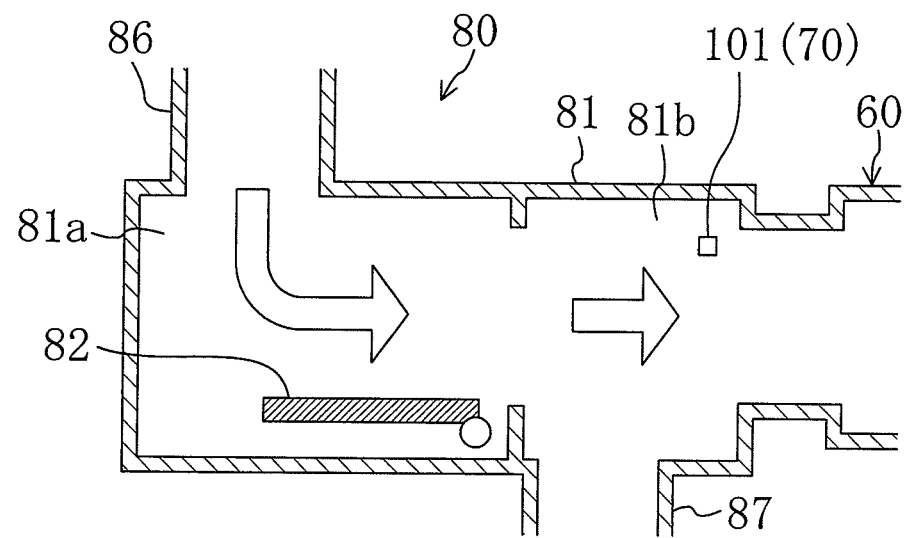
FIG. 16 is a horizontal cross-section of a structure of full condition detection means according to the second embodiment, in relation to an introduction duct.

As shown in FIG. 16, the full condition detection means (70) of the present embodiment includes an air speed sensor (101). A damper drive motor (83), a drive gear (84) and a driven gear (85) are omitted from FIG. 16, as well as from FIGS. 17-19 described later. The air speed sensor (101) is provided in the second chamber (102) of the damper box (81), and is located closer to the dust storage container (60). The air speed sensor (101) detects the speed of air flowing in the damper box (81) in the full condition detection operation. In other words, the air speed sensor (101) detects the speed of air (air blown by the indoor fan (21)) which passes through the storage portion (62) toward the dust collecting box (90).

The full condition detection means (70) of the present embodiment detects a dust full condition of the dust collecting box (90), based on the air speed detected by the air speed sensor (101). Specifically, if the air speed detected by air speed sensor (101) exceeds a set value in the full condition detection operation, it is determined that the dust collecting box (90) is not full of dust. If the amount of dust in the dust collecting box (90) is small, the air blown by the indoor fan (21) flows from the introduction duct (86) to the dust collecting box (90) relatively easily. Thus, the air speed (flow speed of air) flowing through the introduction duct (86) and the storage portion (62) is relatively high. In contrast, if the air speed detected by the air speed sensor (101) is equal to or less than a set value, it is determined that the dust collecting box (90) is full of dust. If the dust collecting box (90) is full of dust (if the amount of dust is extremely large), the air blown by the indoor fan (21) cannot easily flow from the introduction duct (86) to the dust collecting box (90). Thus, the air speed (flow speed of air) flowing through the introduction duct (86) and the storage portion (62) significantly decreases. In other words, the amount of air flowing through the introduction duct (86) and the storage portion (62) decrease as the amount of dust in the dust collecting box (90) increases. As a result, air speed decreases.

As described above, the full condition detection means (70) is configured to determine the amount of dust in the dust collecting box (90), based on the amount and speed of air passing through the introduction duct (86) and the storage portion (62) toward the dust collecting box (90), and to detect a full condition of the dust collecting box (90). Thus, it is possible to recognize, with a simple structure, the full condition of the dust collecting box (90). The other structures, operations and effects are the same as those of the first embodiment.

Further, in the present embodiment as well, the full condition detection operation does not have to be performed after the completion of the dust transfer operation, but may be performed during the dust transfer operation. For example, if the air speed detected by the air speed sensor (101) is equal to or less than a set value in the dust transfer operation, it is determined that the dust collecting box (90) is full of dust.

—First Variation of Second Embodiment—

Figure 17:
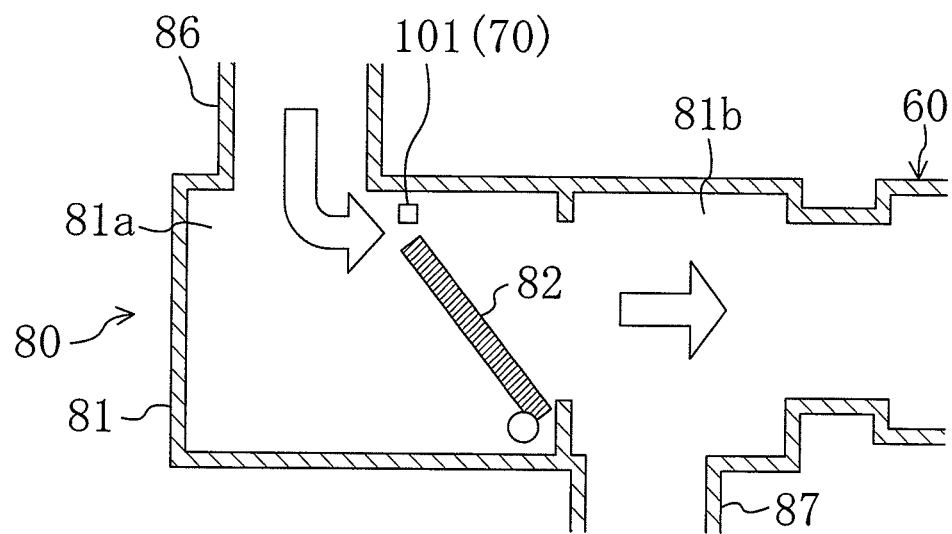
FIG. 17 is a horizontal cross-section of a structure of full condition detection means according to the first variation of the second embodiment, in relation to an introduction duct.

The first variation of the second embodiment will be described. In the present variation, the location of the air speed sensor (101) is changed from the location as in the second embodiment, as shown in FIG. 17.

According to the full condition detection operation of the present variation, the damper (82) of the damper box (81) is not fully opened, but half opened. Thus, the damper (82) serves as a throttle portion in the damper box (81). The air speed sensor (101) is positioned at the open portion of the damper (82). The speed of air increases at the open portion of the damper (82) because the flow passage area is reduced at the open portion of the damper (82). Thus, air speed sensor (101) can detect an air speed greater than the air speed detected when the damper (82) is fully opened. Therefore, it is possible to reliably detect an air speed in the damper box (81) and change in the air speed. As a result, the accuracy in detecting the full condition of the dust collecting box (90) can be improved.

In general, a measurement range is set for the air speed sensor. Even in such a case, an air speed which falls within the measurement range can be generated in the damper box (81) by changing the aperture of the damper (82). For example, in the case where the measurement sensitivity of the air speed sensor (101) is low, the air speed in the damper box (81) can be increased by reducing the aperture of the damper (82). On the other hand, in the case where the measurement sensitivity of the air speed sensor (101) is high, the air speed in the damper box (81) can be decreased by increasing the aperture of the damper (82). This structure allows an increase in flexibility in the choice of the air speed sensor (101). The other structures, operations and effects are the same as those in the first embodiment.

—Second Variation of Second Embodiment—

Figure 18:
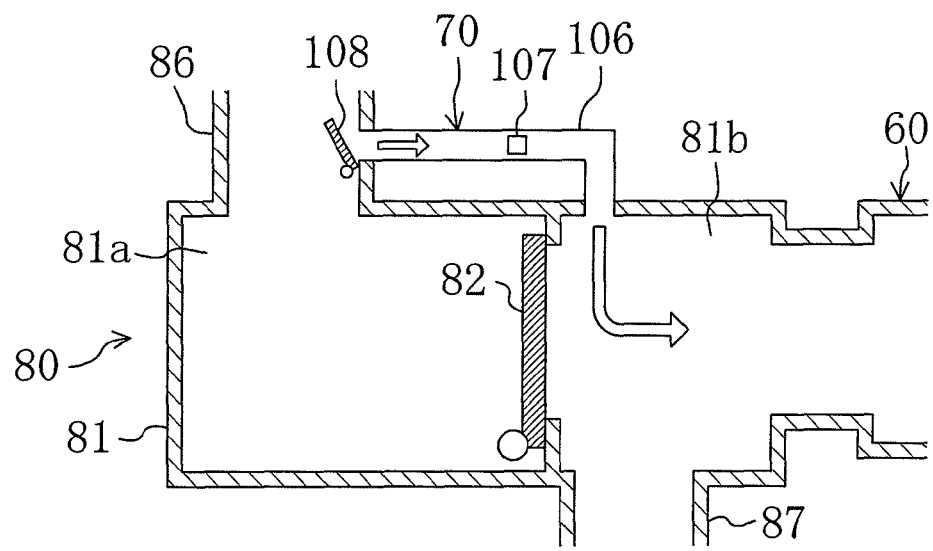
FIG. 18 is a horizontal cross-section of a structure of full condition detection means according to the second variation of the second embodiment, in relation to an introduction duct.

The second variation of the second embodiment will be described. A structure of the present variation is one in which the full condition detection means (70) according to the second embodiment is changed as shown in FIG. 18.

The full condition detection means (70) of the present variation includes a bypass passage (106), an air speed sensor (107), and a bypass damper (108). The intake end of the bypass passage (106) is open in the introduction duct (86) at an upstream side portion of the damper box (81), and the discharge end of the bypass passage (106) is open in the second chamber (81b) of the damper box (81). Further, the flow passage area of the bypass passage (106) is smaller than the flow passage area of the introduction duct (86). The air speed sensor (107) is provided in the bypass passage (106), and detects the speed of air passing through the bypass passage (106). The bypass damper (108) is provided at the intake end of the bypass passage (106), for opening and closing the intake end opening.

In the full condition detection operation of the present variation, the damper (82) of the damper box (81) is fully closed, and the bypass damper (108) is opened. Thus, the air blown by the indoor fan (21) is introduced into the storage portion (62) from a portion in the introduction duct (86) through the bypass passage (106). Here, the flow passage area of the bypass passage (106) is smaller than the flow passage area of the introduction duct (86). Therefore, even if the volume of air blown by the indoor fan (21) are the same, the speed of the air passing through the bypass passage (106) is greater than the speed of air passing through the introduction duct (86). The greater air speed is detected by the air speed sensor (107). Thus, as is the case of the first variation, the air speed and change in the air speed can be reliably detected during the full condition detection operation. As a result, the accuracy in detecting the full condition of the dust collecting box (90) is improved. The other structures, operations and effects are the same as those in the first embodiment.

In the present variation as well, an air speed which falls within the measurement range of the air speed sensor (107) can be generated in the bypass passage (106) by changing the aperture of the bypass damper (108). In other words, the air speed is increased by decreasing the aperture of the bypass damper (108), and the air speed is decreased by increasing the aperture of the bypass damper (108).

<Third Embodiment>

The third embodiment of the present invention will be described. An indoor unit (1) of the present embodiment, too, has a structure in which the full condition detection means (70) according to the first embodiment is changed.

Figure 19:
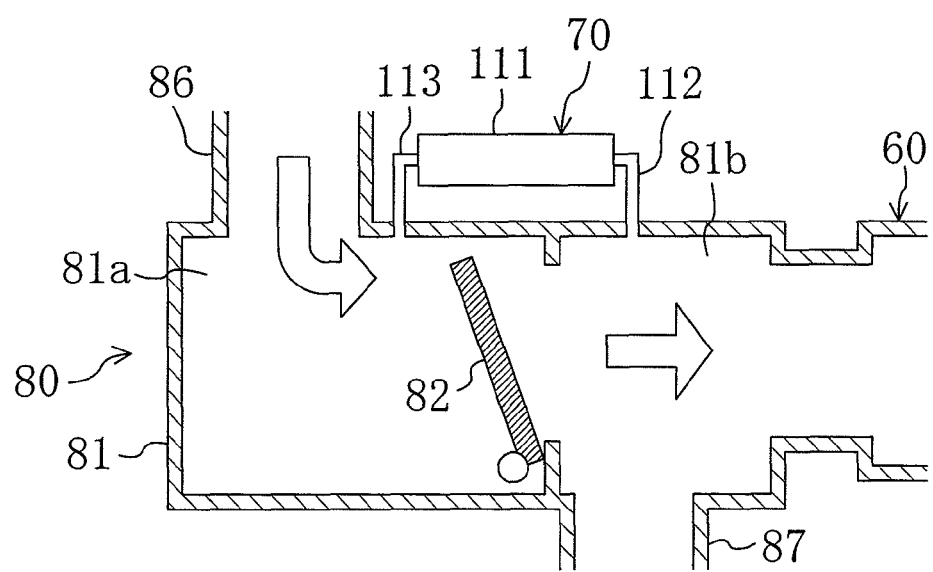
FIG. 19 is a horizontal cross-section of a structure of full condition detection means according to the third embodiment, in relation to an introduction duct.

As shown in FIG. 19, the full condition detection means (70) of the present embodiment includes a sensor body (111), a downstream side pipe (112), and an upstream side pipe (113). The upstream side pipe (113) allows the first chamber (81a) of the damper box (81) and the sensor body (111) to communicate to each other. The downstream side pipe (112) allows the second chamber (81b) of the damper box (81) and the sensor body (111) to communicate to each other. The sensor body (111) forms a differential pressure sensor which detects a difference in wind pressure (differential pressure) between the first chamber (81a) and the second chamber (81b) in the damper box (81).

In the full condition detection operation of the present embodiment, the damper (82) of the damper box (81) is half opened, as in the case of the first variation of the second embodiment. Thus, the damper (82) serves as a throttle portion of the passageway of the damper box (81). Thus, in the damper box (81), the air introduced into the first chamber (81a) is depressurized at the throttle portion, and flows in the second chamber (81b). In other words, the wind pressure in the second chamber (81b), which is on the downstream side of the damper (82), is lower than the wind pressure in the first chamber (81a), which is on the upstream side of the damper (82). The difference in wind pressure (differential pressure) between the upstream side and the downstream side of the damper (82) is detected by the sensor body (111).

The full condition detection means (70) of the present embodiment detects, in the full condition detection operation, the dust full condition of the dust collecting box (90) based on the differential pressure detected by the sensor body (111). Specifically, in the full condition detection operation, if the differential pressure detected by the sensor body (111) exceeds a set value, it is determined that the dust collecting box (90) is not full of dust. In the case where the amount of dust in the dust collecting box (90) is small, the air blown by the indoor fan (21) flows from the introduction duct (86) to the dust collecting box (90) relatively easily. Thus, the air speed (flow speed of air) and wind pressure in the entire introduction duct (86) are relatively high, which increases the differential pressure between the upstream side and the downstream side of the damper (82). On the other hand, if the differential pressure detected by the sensor body (111) is equal to or less than a set value, it is determined that the dust collecting box (90) is full of dust. If the dust collecting box (90) is full of dust (if the amount of dust is extremely large), the air blown by the indoor fan (21) cannot easily flow from the introduction duct (86) to the dust collecting box (90). Thus, the air speed (flow speed of air) and wind pressure in the entire introduction duct (86) are low, which decreases the differential pressure between the upstream side and the downstream side of the damper (82). In other words, the amount of air flowing through the introduction duct (86) and the storage portion (62) decreases as the amount of dust in the dust collecting box (90) increases. As a result, the differential pressure detected by the sensor body (111) decreases. As described above, in the present embodiment as well, it is possible to recognize, with a simple structure, the full condition of the dust collecting box (90).

Further, in general, a measurement range is set for the differential pressure sensor, like the air speed sensor. Even in such a case, a differential pressure between the upstream side and the downstream side of the damper (82) that falls within the measurement range can be generated by changing the aperture of the damper (82). For example, in the case where the measurement sensitivity of the sensor body (111) is low, the differential pressure in the damper box (81) can be increased by reducing the aperture of the damper (82). On the other hand, in the case where the measurement sensitivity of the sensor body (111) is high, the differential pressure in the damper box (81) can be decreased by increasing the aperture of the damper (82). This structure allows an increase in flexibility in the choice of the sensor body (111). The other structures, operations and effects are the same as those in the first embodiment.

<Other Embodiments>

The following structures may be used in the above embodiments.

For example, in the above embodiments, the removed dust is stored in the storage portion (62) of the dust storage container (60), that is, the storage portion (62) is structured to serve as a container. However, the present invention may have the following structure. For example, the dust storage container (60) (excluding the dust removal means (50)) may be omitted, and part of the transfer duct (88) may serve as the storage portion (62) according to the present invention. In other words, part of the introduction duct (86) and the transfer duct (88), i.e., passageways for transfer, may be structured to serve as the storage portion (62).

Further, in the above embodiments, the dust in the dust storage container (60) is transferred by utilizing the air blown by the indoor fan (21). However, the present invention is not limited to this structure. A fan for transfer may be individually provided to transfer dust by utilizing the air blown by the fan.

Further, in the above embodiments, the air filter (30) has a circular shape. However, the structure is not limited to this, but the air filter (30) may have a rectangular shape. In this case, for example, the air filter (30) moves linearly with respect to the rotating brush (51).

Further, in the above embodiments, the air blown by the indoor fan (21) before passing through the indoor heat exchanger (22) is introduced into the damper box (81). However, according to the present invention, the same dust transfer operation can be performed even if the air having passed through the indoor heat exchanger (22) is introduced. In this case, during a cooling operation for example, the air cooled by the indoor heat exchanger (22) flows through the dust storage container (60) etc., and therefore, condensation may be formed on the dust storage container (60) etc, As such, in this case, the dust storage container (60) and the ducts (86, 88) may be covered with a heat insulation to prevent condensation.

Further, in the above embodiments, an indoor unit (1) mounted in the ceiling of a room was described. However, the present invention is not limited to this structure, but may be applied to a so called wall-mounted indoor unit, which is mounted on the wall of the room.

The foregoing embodiments and variations are merely preferred examples in nature, and are not intended to limit the scope, applications, and use of the invention.

Industrial Applicability

As described above, the present invention is useful as an indoor unit of an air conditioner that includes a dust storage container for storing dust removed from the air filter.

The invention claimed is:

1. An indoor unit of an air conditioner, the indoor unit having in a casing an indoor heat exchanger, an indoor fan for drawing air from a room, and an air filter located on an intake side of the indoor fan, the indoor unit comprising:
   a dust removal device for removing dust captured by the air filter;
   a storage portion for storing the dust removed by the dust removal device;
   a dust collecting box which communicates with the storage portion;
   a dust transfer device for transferring, together with air, the dust stored in the storage portion to the dust collecting box by utilizing an effect of blown air or an effect of suction; and
   a full condition detection device for detecting a dust full condition of the dust collecting box, based on an amount of transmission of light through the storage portion, wherein
   the full condition detection device includes a light emitting portion and a light receiving portion located inside the indoor unit.

2. The indoor unit of the air conditioner of claim 1, wherein the full condition detection device includes the light emitting portion located outside the storage portion, and the light receiving portion which is opposed to the light emitting portion, with the storage portion interposed therebetween, and which detects an intensity of light of the light emitting portion that has passed through the storage portion, and the full condition detection device is configured to detect the dust full condition of the dust collecting box, based on the intensity of light detected by the light receiving portion.

3. The indoor unit of the air conditioner of claim 2, wherein openings through which the light of the light emitting portion is transmitted are formed in a storage wall of the storage portion, and
   the full condition detection device includes a housing which is provided so as to close the openings of the storage portion and in which the light emitting portion and the light receiving portion are accommodated so as to correspond to the openings of the storage portion.

4. The indoor unit of the air conditioner of claim 2 or claim 3, wherein
   the light emitting portion is an LED, and
   the light receiving portion is a phototransistor or a photodiode.

5. The indoor unit of the air conditioner of claim 1, wherein the dust transfer device includes an air passageway for introducing air blown by the indoor fan into an interior of the storage portion and transferring the dust stored in the storage portion to the dust collecting box.

6. The indoor unit of the air conditioner of claim 5, wherein the air passageway is configured to introduce the air blown by the indoor fan into the storage portion before the air blown by the indoor fan passes through the indoor heat exchanger.

* * * * *